US006465031B1

(12) United States Patent
Bush et al.

(10) Patent No.: US 6,465,031 B1
(45) Date of Patent: *Oct. 15, 2002

(54) PROCESS FOR REDUCING FLATULENCE IN LEGUMES

(75) Inventors: Condon S. Bush, Knoxville, TN (US); Griscom Bettle, III, Sarasota, FL (US); Joseph L. Rutzinski, Morristown, TN (US)

(73) Assignee: Bush Brothers & Company, Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/236,314

(22) Filed: Jan. 22, 1999

Related U.S. Application Data
(60) Provisional application No. 60/072,183, filed on Jan. 22, 1998.

(51) Int. Cl.$^7$ .................................................. A23L 1/211

(52) U.S. Cl. ..................... 426/486; 426/507; 426/508; 426/634

(58) Field of Search ................................ 426/506, 507, 426/508, 486, 634, 431, 478

(56) References Cited

U.S. PATENT DOCUMENTS

| | | |
|---|---|---|
| 202,975 A | 4/1878 | Andres |
| 1,495,736 A | 5/1924 | Hadley |
| 1,548,796 A | 8/1925 | Libby |
| 1,718,187 A | 6/1929 | Bartlett |
| 1,813,268 A | 7/1931 | Bachler |
| 2,232,282 A | 2/1941 | Struble |
| 2,278,475 A | 4/1942 | Musher |
| 2,360,062 A | 10/1944 | Lannen |
| 2,952,543 A | 9/1960 | Szczesniak et al. |
| 3,126,285 A | 3/1964 | Lippold |
| 3,220,451 A | 11/1965 | Bollens et al. |
| 3,253,930 A | 5/1966 | Gould et al. |
| 3,290,159 A | 12/1966 | Dorsey et al. |
| 3,364,034 A | 1/1968 | Hoersch et al. |
| 3,594,184 A | 7/1971 | Hawley et al. |
| 3,594,185 A | 7/1971 | Hawley et al. |
| 3,594,186 A | 7/1971 | Hawley et al. |
| 3,598,610 A | 8/1971 | Hawley et al. |
| 3,632,346 A | 1/1972 | Sherba |
| 3,869,556 A * | 3/1975 | Rockland et al. ............ 426/352 |
| 3,876,807 A * | 4/1975 | Wagner et al. ................ 426/46 |
| 3,971,856 A | 7/1976 | Daftary |
| 3,973,047 A | 8/1976 | Linaberry et al. |
| 4,064,277 A | 12/1977 | Yokotsuka et al. |
| 4,137,339 A * | 1/1979 | Kudo et al. .................. 426/634 |
| 4,194,016 A | 3/1980 | Weaver et al. |
| 4,216,235 A | 8/1980 | Dasek et al. |
| 4,333,955 A | 6/1982 | Murata et al. |
| 4,376,127 A | 3/1983 | Lunde |
| 4,376,128 A | 3/1983 | Lunde |
| 4,407,840 A | 10/1983 | Lathrop et al. |
| 4,483,874 A | 11/1984 | Olsen |
| 4,645,677 A | 2/1987 | Lawhon et al. |
| 4,729,901 A | 3/1988 | Rockland et al. |
| 4,871,567 A | 10/1989 | Sterner et al. |
| 4,908,224 A | 3/1990 | Yoder |
| 5,100,679 A | 3/1992 | Delrue |
| 5,436,003 A | 7/1995 | Rohde, Jr. et al. |
| 5,445,957 A | 8/1995 | Rohde, Jr. et al. |
| 5,545,425 A | 8/1996 | Wu |
| 5,599,572 A | 2/1997 | Bourne |
| 5,607,712 A | 3/1997 | Bourne |
| 5,645,879 A | 7/1997 | Bourne |
| 5,648,210 A | 7/1997 | Kerr et al. .................. 800/200 |
| 5,651,967 A | 7/1997 | Rohde, Jr. et al. |
| 5,710,365 A | 1/1998 | Kerr et al. ..................... 435/6 |
| 5,773,699 A | 6/1998 | Kerr et al. .................. 800/205 |
| 5,871,801 A | 2/1999 | Kazemzadeh ............... 426/634 |

OTHER PUBLICATIONS

Stone, M., et al. "The Brilliant Bean" A Bantam Book, Feb. 1988, pp. 9–30, 136, and 154.
Abdel—Gawad, A.S., "Effect of domestic processing on oligosaccharide content of some dry legume seeds," *Food Chemistry*, vol. 46, (1993), pp. 25–31.
"The International Dry Bean Symposium," Michigan State University, Michigan Bean Commission, Michigan Bean Shippers Association, Aug. 22–24, 1972.
Borejszo, Z., et al., "Reduction of Flatulence–Causing Sugars by High Temperature Extrusion of Pinto Bean Starch Fractions," *Journal of Food Science*, vol. 57(3), (1992), pp. 771–772.
Calloway, D.H., et al., "Reduction of Intestinal Gas–Forming Properties of Legumes by Traditional and Experimental Food Processing Methods," *Journal of Food Science*, vol. 36, (1971), pp. 251–255.
Fleming, S.E., "Flatulence Activity of the Smooth–Seeded Field Pea as Indicated by Hydrogen Production in the Rat," *Journal of Food Science*, vol. 47, (1981), pp. 12–15.
Fleming, S.E., "A Study of Relationships Between Flatus Potential and Carbohydrate Distribution in Legume Seeds," *Journal of Food Science*, vol. 46, (1981), pp. 794–803.
Fyfield, T.P., et al., "Effects of Temperature and Water Potential on Germination, Radicle Elongation and Emergence of Mungbean," *Journal of Experimental Botany*, vol. 40(215), Jun. 1989, pp. 667–674.
Ganiats, T.G., et al., "Does Beano Prevent Gas? A Double–blind Crossover Study of Oral α–Galactosidase to Treat Dietary Oligosaccharide Intolerance," *The Journal of Family Practice*, vol. 39(5), Nov. 1994, pp. 441–445.
Goel, R., et al., "Removal of Flatulence Factor of Some Pulses by Microbial Fermentation," *The Ind. J. Nutr. Dietet.*, vol. 18, (1980), pp. 215–217.

(List continued on next page.)

*Primary Examiner*—Arthur L. Corbin
(74) *Attorney, Agent, or Firm*—Scully, Scott, Murphy & Presser

(57) ABSTRACT

The present invention is directed to a method of preparing a legume resulting in reduced flatulence when ingested and the product thus prepared. It is also directed to a process for reducing the flatulence of a flatulence-causing legume. It is also directed to a product produced therefrom.

14 Claims, 2 Drawing Sheets

OTHER PUBLICATIONS

Hsu, D., et al., "Effect of Germination on Nutritive Value and Baking Properties of Dry Peas, Lentils, and Faba Beans," *Journal of Food Science*, vol. 45, (1980), pp. 87–92.

Iyer, V., et al., "Quick–cooking beans (*Phaseolus vulgaris* L.): I. Investigations on quality," *Qual. Plant Plant Foods Hum. Nutr.*, vol. 30, (1980), pp. 27–43.

Kinsella, J.E., "Functional Properties of Proteins in Foods: A Survey," *Critical Reviews in Food Science and Nutrition*, Apr. 1976, pp. 219–280.

Khokhar, S., et al., "Physico–Chemical Characteristics of Khesari Dhal (*Lathyrus sativus*): Changes in α–Galactosides, Monosaccharides and Disaccharides during Food Processing," *J. Sci. Food Agric.*, vol. 70, (1996).

Ingrassia, L., "Dr. Colin Leakey, A Real Bean Counter, Finds Profit Elusive," *The Wall Street Journal*, Apr. 1, 1997, p. 1.

Leakey, C.L.A., et al., "Beans, Fibre, Health and Gas," *Agri–Food Quality: an Interdisplinary Approach*, pp. 175–180.

Liu, K., et al., "Mechanism of Hard–to–Cook Defect in Cowpeas: Verification Via Microstructure Examination," *Food Structure*, vol. 12, (1993), pp. 51–58.

de Lumen, B.O., "Molecular Strategies to Improve Protein Quality and Reduce Flatulence in Legumes: A Review," *Food Structure*, vol. 11, (1992), pp. 33–46.

Mulimani, V.H., et al., "Enzymatic degradation of oligosaccharides in soybean flours," *Food Chemistry*, vol. 59(2), (1997), pp. 279–282.

Obendorf, R., "Oligosaccharides and galactosyl cyclitols in seed desiccation tolerance," *Seed Science Research*, vol. 7, (1997), pp. 63–74.

Olson, A.C., et al., "Flatus Causing Factors in Legumes," *Antinutrients and Natural Toxicants in Foods*, Food & Nutrition Press, Inc., (1981), pp. 275–294.

Abstract of Papers, Olson, A.C., "Flatus Causing Factors in Legumes," *American Chemical Society*, vol. 177(1), p. 37.

Powers, J.J., et al., "Gelation of Canned Peas and Pinto Beans as Influenced by Processing Conditions, Starch and Pectic Content," *Food Technology*, Feb. 1961, pp. 41–47.

Price, K.R., et al., "Flatulence—Causes, relation to diet and remedies," *Die Nahrung*, vol. 32(6), (1988), pp. 609–626.

Rao, V.S., et al., "Effects of Gamma–Irradation on Flatulence–Causing Oligosaccharides in Green Gram (*Phaseolus areus*)," *Journal of Food Science*, vol. 48, (1983), pp. 1791–1795.

Schoch, T.J., et al., "Preparation and Properties of Various Legume Starches," Nov. 1968, pp. 565–573.

Naczk, M., et al., "α–Galactosides of Sucrose in Foods: Composition, Flatulence–Causing Effects, and Removal," *American Chemical Society*, ACS Symposium Series 662, pp. 127–151.

Sathe, S.K., et al., "Dry Beans of Phaseolus. A review. Part 2. Chemical Composition: Carbohydrates, Fiber, Minerals, Vitamins and Lipids," *CRC Critical Reviews in Food Science and Nutrition*, vol. 21(1), pp. 41–93.

Sathe, S.K., et al., "Technology of Removal of Unwanted Components of Dry Beans," *CRC Critical Reviews in Food Science and Nutrition*, vol. 21(3), pp. 263–287.

Ku, S., et al., "Extraction of Oligosaccharides During Cooking of Whole Soybeans," *Journal of Food Science*, vol. 41, (1976), pp. 361–364.

Uebersax, M.A., et al., "Strategies and Procedures for Processing Dry Beans," *Food Technology*, Sep. 1991, pp. 104–110.

Kon, S., "Pectic Substances of Dry Beans and Their Possible Correlation with Cooking Time," *Journal of Food Science*, vol. 33, (1968), pp. 437–438.

Vidal—Valverde, C., et al., "Changes in the carbohydrate composition of legumes after soaking and cooking," *Journal of the American Dietetic Association*, vol. 93(5), May 1993, pp. 547–550.

"Flatulence Problem," *CRC Handbook of World Food Legumes*, vol. 1, pp. 64–74.

Chung, Y., Dissertion: "Changes in Cell Wall Structure and Starch Digestibility During Cooking of Dry Bean (*Phaseolus vulgaris* L.)," Michigan State University, 1996.

King, M.M., Dissertion: "Alpha–Galactosidase Activity and Oligosaccharide Hydrolysis in cowpea (*Vigna unguiculata* L. Walp) Seeds and Flour)," University of Arkansas, May 1987.

* cited by examiner

PROCESS FOR REDUCING FLATULENCE IN LEGUMES

RELATED APPLICATION

The present application is claiming benefit of provisional application 60/072,183 filed on Jan. 22, 1998.

FIELD OF THE INVENTION

The present invention relates to a process for preparing legumes exhibiting reduced flatulence when digested by mammals and a process for reducing flatulence in legumes when digested by mammals and the products thus prepared.

BACKGROUND OF THE INVENTION

Legumes are important foodstuffs and are likely to become more so in the future. For example, many legumes, especially those in some of the legume genuses, such as Phaseolus, Soja and Lens, are high in protein and provide an inexpensive alternative to animal protein.

Unfortunately, ingestion of some of the most nutritious and abundant legumes can be accompanied by severe flatulence as well as abdominal distress and poor digestibility. More specifically, the flatulence results in discomfort, diarrhea, loss of appetite, and poor growth, all of which have prevented the wide-scale use of these vegetable nutrients.

It is believed that the flatulence is due to various factors. For example, it has been postulated that the flatulence is attributable to the indigestibility by mammalian digestive enzymes of the flatulence-causing alpha oligosaccharides, such as raffinose, stachyose, and verbascose, and the like, present in legume products. The generally accepted explanation of the action of the alpha oligosaccharides in producing flatulence is that the enzyme alpha galactosidase, which hydrolyzes the $\alpha$-oligosaccharides, is not present in the intestinal tract of mammals. Thus, these compounds are not hydrolyzed and dissolved in the digestive tract so that they can be absorbed. Instead, they reach the lower intestine essentially intact. Here, anaerobic bacteria ferment these sugars with the resultant production of carbon dioxide, hydrogen, and methane gases, thereby producing flatus.

However, these $\alpha$-oligosaccharides are believed not to be the only source present in the legume that causes flatulence. It has been reported that flatulence is also due to components present in the cell wall fiber constituents. Others have conjectured that undigested starch and protein in the legumes are contributing factors to flatus production.

Various solutions have been proposed to reduce flatulence in legumes, but many of these focus on just one of the factors described herein above, viz., the flatulence-causing oligosaccharides. More specifically, many proposed solutions relate to the use of enzymes to enhance the digestibility of the oligosaccharides. Thus, one solution is to add oligosaccharide-digesting enzymes to the legume itself or as a food supplement to be ingested substantially simultaneously with the ingestion of the legume. For example, U.S. Pat. No. 3,632,646 to Sherba discloses the addition to foodstuff, such as legumes, of $\alpha$-galactosidases or other enzyme preparations capable of hydrolyzing the 1,6- linkages of stachyose and other food containing flatulence-causing polysaccharides. U.S. Pat. Nos. 4,376,127 and 4,376,128 to Lunde disclose a process of improving the digestibility of legumes and reducing the flatulence thereof by adding an enzyme system found in pineapple and papaya to the legumes prior to cooking said legumes. U.S. Pat. No. 5,651,967 to Rohde, Jr., et al. discloses a food supplement comprising a beta- fructofuranosidase which is alleged to enhance the digestibility of sugars and reduce flatulence. U.S. Pat. Nos. 5,445,957 and 5,651,967 disclose a food supplement to be ingested simultaneously with the legume comprising a beta- fructofuranosidase enzyme, a cellulose enzyme and a hemicellulose enzyme which together alleviate gastrointestinal distress caused from the digestion of legumes.

Another solution is leaching the oligosaccharides from the legumes. For example, one method is to soak the legume product in water. Sometimes, the soak is in hot water that gradually cools as the soaking progresses. The soaking water may or may not be changed with fresh water. By this method, it has been found that soaking significantly decreases the $\alpha$-galactoside content in lentils. (See, Frias, et al, *Journal of Food Protection*, 1995, 58, 692–695.) In addition, it has been found that cooking, by either boiling or pressure cooking, also decreases the $\alpha$-galactoside content. (See, Vidal-Valverde, et al., *Journal of American Dietetic Association*, 1993, 93, 547–550).

Industrial soaking, which can be used to leach the oligosaccharides from the legumes, falls into two main processes. The most practiced is an ambient or initially warm soak that is allowed to cool naturally for several hours, followed by a very short blanch at typically 180° F. The high controlled temperature blanch is used to optimize initial rehydration, deaerate the legumes and coagulate the protein to prevent starch leaching out of the legumes during cooking.

A second industrial process is to use multiple short soak times at temperatures sufficient to accelerate the rehydration process. In this process, the legumes are heated in a series of blanchers.

Other methods utilized and/or proposed to reduce flatulence include dehulling of the bean (See U.S. Pat. No. 202,975); fermenting the legume with a microbe (See, Goel, et al., *Indian J. Nutr. Dictet*, 1980, 18, 215–217); and germinating the legume (See, e.g., Rao, et al. *J. Agric Food Chem.*, 1978, 26, 316–319). In fact, Rao, et al. in *Journal of Food Science*, 1983, 1791–1795 disclose that γ-irradiation is effective for elimination of flatulence-causing oligosaccharides in legumes during germination.

In the Ph.D. thesis of Matrid King from the University of Arkansas (1987), the use of endogenous $\alpha$-galactosidase in cowpeas was explored for the purpose of removing the flatulence-causing oligosaccharides therefrom. For example, soaking, germination, and fermentative and non-fermentative incubation treatments for stimulating $\alpha$-galactosidase hydrolysis of the oligosaccharides were investigated. The thesis disclosed that the enzyme activity of the $\alpha$-galactosidase increased until a temperature maximum of 113° F. was obtained, i.e., above this temperature the enzyme activity decreased. For example, a two minute incubation at 50° C. (122° F.) 55° C. (129° F.) and 60° C. (140° F.) resulted in a 50, 70 and 90% loss of activity compared to the activity at 113° F. In addition, King disclosed that endogenous $\alpha$-galactosidase has maximum enzymatic activity at a pH ranging between 4.0 and 5.0.

Although these methods described hereinabove may be useful in reducing flatulence caused by oligosaccharides, these methods have not been successful in substantially removing the flatulence-causing oligo-saccharides from the legumes. In addition, these methods have ignored the flatulence caused by other components of the legumes. It has been suggested by researchers, however, that, at least with beans, oligosaccharides account for only about ⅓ of the cause of flatulence, and that ⅔ is caused by other components such as, e.g., undigested starch in the bean. Other research indirectly suggests that the sugars are responsible for the violent "episodes" that occur approximately within five hours after ingestion of the legume, while "background flatulence", which occurs regularly over a six to eight hour period after eating, is caused by the non-digested starch. Unfortunately, very little research, in comparison, has been directed to reducing the flatulence caused by these other components.

Recently, Yansoo Chung, in his Ph.D. thesis from Michigan State University (1996), reported that cooking whole navy beans for 10 minutes caused starch crystallization within the cell wall of the navy beans, thus impeding and preventing the digestive enzymes in the stomach from digesting (hydrolyzing) the starch.

Therefore, additional investigations are required to find the appropriate conditions to prevent such crystallization from occurring and thereby enhance the digestibility of these starches in the bean.

To date, no one has found a means to effectively reduce the flatulence caused by the digestion of legumes and thus, legumes, such as beans, remain unappealing to many consumers.

The present inventors have found such a solution. More specifically, they have found a means of significantly reducing the flatulence of legumes.

SUMMARY OF THE INVENTION

The present invention is directed to a process for reducing the flatulence caused by the digestion of the legume in mammals, which process comprises:

(1) soaking a legume in a water bath in stagnant, sprayed or flowing water at a first temperature which is at or above ambient temperature and below the critical rehydration temperature of the legume under conditions effective and for a period of time sufficient to produce a rehydrated legume having a moisture content which is at least 50% of a fully hydrated legume;

(2) soaking and heating the rehydrated legume of step (a) to a second temperature at a pH ranging from about 5.5 to about 9.0 under conditions effective to diffuse the flatulence-causing oligosaccharides from the legume to the soak water and to permit the naturally occurring oligosaccharide reducing enzyme present in the legume to digest the remaining flatulence-causing oligosaccharides in the legume to produce a legume that has substantially all of the flatulence-causing oligosaccharides removed therefrom, said second temperature being greater than the critical rehydration temperature and said first temperature and less than the inactivation temperature of said enzyme;

(3) heating the product of step (2) in a water bath to a third temperature under conditions effective and for a time sufficient to initiate gelatinization of starch present therein, said third temperature being greater than the first and second temperatures and the inactivation temperature of said naturally occurring oligosaccharide reducing enzyme, but less than the temperature to substantially coagulate the protein surrounding the starch granules in said legume; and (4) optionally blanching the product of step (3) at a fourth temperature under effective blanching conditions, said fourth temperature being greater than the first, second and third temperatures.

The present invention is also directed to the preparation of a legume exhibiting reduced flatulence when digested by a mammal, which comprises repeating steps (1)–(3) hereinabove, and optionally step (4) and then (5) mixing the legume thus treated with a food acceptable vehicle to form a legume-based mixture; and (6) treating the product of step (5) under the desired preservation methods.

The present invention is also directed to the product thus formed by the processes described hereinabove.

DETAILED DESCRIPTION OF THE INVENTION

Figure 1:
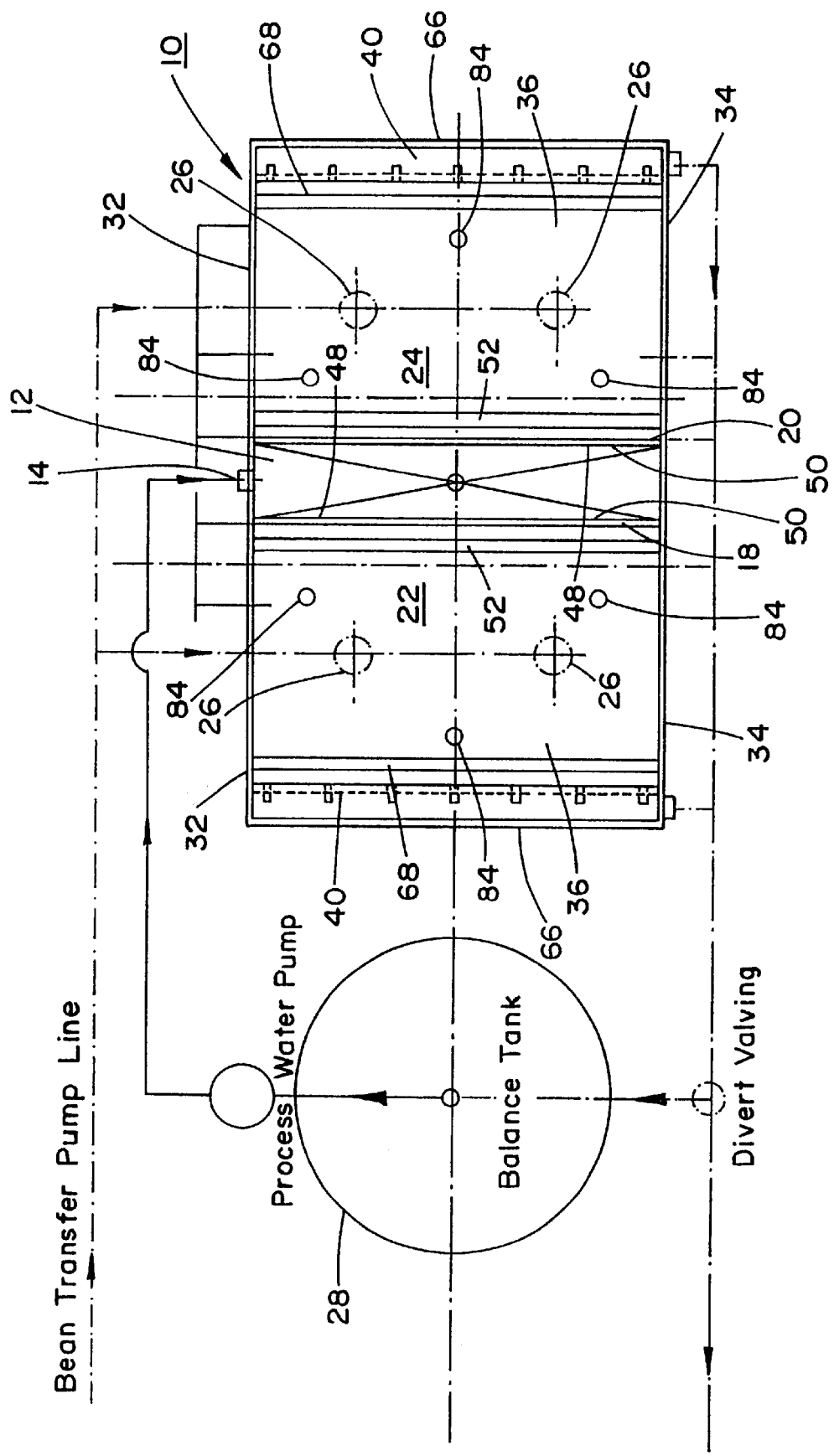
FIG. 1 illustrates, generally diagrammatically, a top plan view of a horizontal flow soak tank system.

As used herein, the term "legume" refers to a vegetable belonging to the family Leguminosae. It is characterized as having a dry, dehiscent fruit derived from a single, simple pistil. When mature, it splits along both dorsal and ventral sutures into two valves. The family Leguminosae characteristically contains a single row of seeds attached along the lower or ventral suture of the fruit. The present invention contemplates the use of the variety of legume seeds comprising the family Leguminosae, but preferably the legume seeds used in the present invention are the usual dry seeds available in commerce. For example, in the case of beans, these products are referred to as dry beans because the product includes only the mature seeds, the pods having been removed. Examples of legume seeds useful in the present invention include seeds of the genus Phaseolus, including, without limitation, the common beans such as large white or Great Northern, small white, pinto, red kidney, black, calico, pink, cranberry, red mexican, brown, bayo, lima, navy and the like; the genus Pisum, including, without limitation, smooth and wrinkled peas and yellow or green varieties and the like; the genus vigna, including the black eye beans (or black eye peas as they are sometimes termed), cowpeas, purple hull peas, cream peas, crowder peas, field peas and the like; the genus Lens, including without limitation, lentils; the genus Cicer, including, without limitation, garbanzo beans and chick peas; the genus Soja, including, without limitation, soybeans; and the like. Other examples of legume seeds useful in the present invention include red beans, yellow-eye beans, azuki beans, mung beans, tepary beans, and fava beans and the like. The preferred legumes are those from the genus Phaseolus, Cicer, and Vigna. The more preferred legumes are navy beans, pinto beans, kidney beans, large white or Great Northern beans, small white beans, black beans, red beans, pink beans, lima beans, lentil, cow peas, soybean, black-eye peas, field peas, garbanzo beans and chick peas. The most preferred legumes are beans, especially navy beans, pinto beans, and kidney beans.

As defined herein, the term "naturally occurring oligosaccharide reducing enzyme" is the enzyme naturally present in the legume which is capable of digesting the flatulence-causing oligosaccharides, as defined herein. Without wishing to be bound it is believed that in beans, especially, navy beans, this enzyme is α-galactosidase.

"Flatulence-causing oligosaccharides", as defined herein, are oligosaccharides that are not digestible by the mammal and cause flatulence as a result therefrom. They are not simple sugars, but include trisaccharides and higher saccharides. Examples include raffinose, stachyose, verbascose, and the like.

As described hereinabove, aspects of the present invention are directed to a process of reducing flatulence in mammals when digesting legumes and a process of preparing legumes exhibiting this reduced flatulence when digested by mammals. The term "mammals" includes any species of the class Mammalia of higher vertebrates which are characterized by, inter alia, being warm blooded, having mammary glands, and having a body covered by hair. Examples include man, dog, cat, horse, pig, cow and the like.

The present inventors realized that many factors contribute to the flatulence caused by legumes. Obviously, one of the objectives of the present invention is to remove the flatulence-causing oligosaccharides, but the present inventors realized that there are other components in addition thereto present in the legume which are responsible for producing flatulence when the legume is ingested by mammals, which other components the prior art has neglected to consider in attempts to reduce flatulence. One example of these other components includes ungelatinized starch. The objective therefore was to either remove these flatulence-causing components from the legume or make these flatulence-causing components more digestible by endogenous enzymes in the mammal or a combination thereof. In addition to removing the flatulence-causing sugars (since the mammalian digestive tract lacks the appropriate endogenous α-galactasidase required to effect digestion of these sugars), the inventors have also found that flatulence can be significantly reduced if these other contributing components referred to hereinabove were made more readily digestible. As described hereinbelow, the present methodology also includes steps that take into account these other components, such as, e.g., maximizing starch gelation, to make the starch more digestible by the mammal, thereby decreasing the flatulence of the legume.

Utilizing the process described herein, the inventors have developed a means of producing legumes, including beans, that exhibit significantly less flatulence when digested. In particular, utilizing the methodology described hereinbelow, the legumes of the present invention have substantially all of the flatulence-causing oligosaccharides, e.g., raffinose, stachyose and verbascose, removed. The concentration of the flatulence-causing oligosaccharides in the legumes produced by the present process is preferably less than about 0.5% and more preferably less than 0.05% by weight of the legume product produced by the present invention and most preferably about 0% by weight.

Moreover, substantially all of the gelatinzable starch present in the legumes produced by the present process is gelatinized, making the legume product more digestible and producing less frequent episodes of flatulence. Legume starch is a restricted starch, meaning that not all of the starch is capable of becoming gelatinized. However, by subjecting the legume to the process described hereinbelow, substantially all of the starch that could be gelatinized, is gelatinized. Preferably, in the legume product produced by the present invention, more than about 80% of the total starch (including gelatinizable as well as non-gelatinizable starch) in the legume is gelatinized and more preferably more than about 85% of the starch in the legume is gelatinized and more preferably more than about 90% of the starch in the legume is gelatinized and most preferably more about 95% of the starch gelatinized. The moisture content of the legume produced by the present process, however, is in the range normally found in legumes that are sold commercially. For example, with respect to beans, it is preferred that the moisture content in the product of the present invention ranges from about 40% to about 70% by weight, more preferably from about 45% to about 65% by weight, and most preferably from about 50% to about 63% by weight.

Thus, the present inventors have developed a process for implementing the aforementioned strategy. More specifically, the present process reduces flatulence caused by the legumes by removing the non-digestible oligosaccharides by mammals in two steps. In the first step, the legume is soaked at a first temperature as defined hereinabove under conditions sufficient to rehydrate the legume to the range described hereinabove.

In the second step, the temperature is raised to a second temperature under conditions sufficient to permit digestion of the flatulence-causing oligosaccharides by the naturally occurring oligosaccharide-reducing enzyme present in the legume and to diffuse the sugar from the legume to the soak water, as described hereinbelow.

The remainder of the process is to reduce the flatulence caused by the other components of the legume, thereby enhancing the digestibility of the legume and reducing the flatus caused by these components upon digestion of the legumes. For example, crystalline starch in the cell of the legume is not readily digestible. Thus, the strategy developed by the present inventors is to subject the legumes to conditions effective to maximally gelatinize the starch, i.e., permit the crystals of starch to transition to an amorphous form (which is digestible by the mammal), while minimizing coagulation of the protein surrounding the starch granules. If protein coagulation occurs too prematurely, it will prevent the starch from fully swelling and gelatinizing, thereby causing the starch to remain undigestible by mammals when ingested. On the other hand, by minimizing protein coagulation before starch gelation, flatulence is reduced since the swollen starch granules are digestible by the mammal when ingested.

The order of the steps in the present process is critical. The sequence of steps follows a logical order whereby the legumes are subjected to lower temperatures in the first step and then progressing after each step to successively higher temperatures. Although within each step, the legumes may be subjected to various temperatures, and/or the temperature of treatment within each step may fluctuate, it is important for this process that the temperature for the treatment of the legumes in the second step be higher than the temperature of treatment in the first step, and that the temperature of treatment in the third step be higher than that of the first and second steps. Since the third step may be conducted at temperatures greater than the inactivation temperature of the naturally occurring oligosaccharide reducing enzyme, it is critical in the present process that temperatures in the first or second step not be raised above the inactivation temperature of the enzyme before the enzyme has substantially completed its function, as described hereinbelow. Once the temperature is raised to the temperatures in the third step, it would be expected that the enzyme will not be able to function in its capacity to reduce the flatulence-causing sugars, even if the temperature is brought down to the levels of the first or second steps of the present process.

Thus, in accordance with the present invention, various steps are required to remove the various flatulence-causing substances and to make the legumes thus treated more digestible.

In the various process steps described hereinbelow, the legumes are placed in water and are soaked therein. Water sources known to the skilled artisan may be utilized in the present invention. By "water source", it is meant the water used to initially soak the legumes or any water subsequently added to the soak water. The term "water source" refers to any source of water or moisture, including steam. Preferably, the water source is tap water, deionized water, distilled water or combinations thereof. Although the water may contain mineral salts, it is more preferable that the water not contain too large a mineral content. Thus, the water source also includes soft water.

The inventors have found that the amount of calcium in the soak water in the first step has an ultimate effect on the frequency of flatus events after ingestion by the mammal. It is preferred therefore, that the soak water used in the first step contains some calcium. Although, the amount of calcium in the soak water in the first step may range from 0 ppm to about 120 ppm, it is preferred that the concentration of calcium in the initial soak water ranges from about 30 ppm to about 100 ppm and most preferably about 50 ppm to about 75 ppm. However, after the first step, in steps 2–3 of the present process, if additional water is added to the soak water or if the soak water is changed, unless indicated to the contrary hereinbelow, soft water (e.g., water containing less than 90 ppm calcium) is preferred over hard-water (e.g., water containing greater than 200 ppm calcium). It is more preferred that the calcium ion concentration in the water from the water source in steps 2–3 of the present process is less than about 70 ppm and more preferably less than about 50 ppm and most preferably having about 0 ppm calcium. If the water from the water source contains too high a level of calcium, the calcium, if desired, can be removed by utilizing ion exchange filtration or passing the water through an ion-exchange column, or treating the hard water with zeolite, utilizing techniques known to the skilled artisan.

The age of the legume utilized in the process described hereinbelow may vary, e.g., from as young as about 1 day or about 1 week after harvesting to as old as two or three years after harvesting. There are differences in behavior between the younger and older legumes. For example, the older legumes will generally take longer to re-hydrate and to remove the flatulence-causing oligosaccharides therefrom, but they generally provide a better yield. Although legumes of various ages may be used in the present process, it is preferred that the legumes utilized in the process described hereinbelow are less than about 13 months old, and more preferred that the legumes are less than about 6 months old and most preferred that the legumes are less than about 4 months old.

In addition, the moisture content of legumes utilized may vary. In particular, moisture content is dependent upon several factors, such as the type of legume, the variety within a type, the growing location, harvest conditions and storage conditions, and the like. For example, with beans, it is typical to see dry beans ranging in moisture content from as low as 8% by weight to as high as 25% by weight. All of these legumes with their varying moisture contents are contemplated to be utilized in the present invention.

The water bath used in the present process may be a tank or other container typically used in the industry for soaking legumes. It may contain a drain and/or be connected to the water source by a feed so that the rate of water entering and leaving the water bath can be controlled and/or monitored. The water bath may be heated by techniques known in the art, such as by steam, hot air, heater, heating element or hot plate and the like. It is preferable that the heating be controlled. It is preferred that the heat be applied directly to the container and more preferably to the water directly, rather than the legume. Soaking can be effected by permitting the legumes to soak with or without stirring or agitation. If the water is stirred, the stirring device is one that is typically used in the industry. The water in the soak tank may be stagnant or flowing. It is preferred that the water in the bath is flowing. It is even more preferred that the water in the bath is recirculating. It is also preferred that the water bath be adiabatic.

The process of the present invention is explained in greater detail hereinbelow. However, before subjecting the legumes to the present process, as described herein, the legumes may optionally undergo preconditioning, which consists of optionally cleaning the legume by conventional methods and an optional pre-soaking. It is to be understood that the optional preconditioning consists of either cleaning the legume, or presoaking or combination thereof. Moreover, if the legumes are subjected to cleaning and pre-soaking, the order is not critical, i.e., the cleaning step may precede the pre-soaking step and vice versa.

If the legumes are subjected to the optional cleaning step, they are cleaned by standard techniques known in the art. Stones, metals, twigs, twine, and other foreign matter are usually removed by passing the legumes through a filter. For example, in one embodiment, they are washed, such as by spray washing, to remove the foreign material. Then they are passed over a vibrating screen cleaner, in which the beans pass through a screen, which has perforations or holes large enough for the legumes to pass through but not large enough for the stones and other large objects to pass through. Large objects are retained as the beans fall through the first screen and are caught by a lower screen. Here, in this latter screen, the perforations in the screen are very small, so that the sand and/or dirt adhering to the bean may pass through, but the legume remains on the lower screen. These legumes may then be stored or be used immediately in the steps described hereinbelow.

For purposes of this invention, "a dry clean legume" is a legume from the field in which the foreign material adhered to or associated with the legume is removed before undergoing any of the method steps of the present invention hereinbelow, i.e., prior to undergoing any significant soaking except that which is used in the cleaning step. Unless indicated to the contrary, the term "dry legumes" refers to a legume having the moisture content of a legume naturally found in the field. Finally, a "pre-soaked legume", as used herein, refers to a legume which has been subjected to preconditioning, as defined hereinbelow. It is preferred that the legume utilized in the present process is a dry legume. It is more preferred that the legume utilized in the present process has a moisture content ranging from about 8% to about 15% by weight. It is even more preferred that the legume used in the present process is a clean dry legume.

The legume may optionally be preconditioned by contacting it with water from a water source at ambient temperatures. Although the legumes begin hydrating in this cleaning step, the amount of hydration is not critical in this step. It varies, depending upon various factors, e.g., the age of the legume, the storage temperature of the legume, humidity, and the like. This optional preconditioning step utilizes a pre-soaking to achieve a substantially uniform moisture content in the legumes. It is preferred, therefore, that the amount of hydration in this step and in the first step of the present process is monitored and controlled. In a preferred embodiment, the legume is contacted with a sufficient amount of a water source (for preconditioning) for a sufficient period of time to produce preconditioned legumes having a moisture content in the range from about 15% to about 30% by weight, using techniques known in the art. The dry legume can be contacted with a water source (for preconditioning) by any method known to the skilled artisan. Examples of useful methods include, but are not limited to, spraying, immersion, repeated dipping, misting, floating, diffusion, steam condensing or combination thereof, with immersion being the most preferred. The preconditioning is effected at ambient temperatures.

Of course, the amount of preconditioning water source used and the period of time necessary for the dry legumes to be in contact with the preconditioning water source to produce the preconditioned legumes will vary depending upon the particular method used to contact the dry legumes with the preconditioned water source. Preferably, the ratio of preconditioning water source to dry legumes is at least about 2:1 to about 4:1 and more preferably from about 2.5:1 to about 3.5:1. Also, preferably, the dry legumes are contacted with the preconditioning water source for a period of time in the range of from about 1 to about 30 minutes and more preferably from about 2 to about 20 minutes and more preferably from about 2 to about 10 minutes.

This optional preconditioning step compensates for variations in the legume, including areas of variations, such as legume size, legume variety, growing area, storage time, storage temperature, storage humidity and the like. This step, if utilized, essentially establishes a common starting point for the process steps described hereinbelow.

Prior to the first step of the present process, it is preferred that the water bath be changed in order to remove any dirt, twigs, and the like that may be present therein as a result of the preconditioning.

The preconditioned legumes are next subjected to the process of the present invention.

In the first step of the present process, after the optional preconditioning step(s), the legume is optionally soaked and rehydrated in a water bath at the temperature described herein under conditions effective to produce a rehydrated legume having a moisture content which is at least 50% by weight of that of a fully hydrated legume.

As used herein, the term "full hydration" or "fully hydrated" or any synonym in reference to legume refers to the moisture level obtained by the legume after soaking in water for four hours at ambient temperature in water containing 90 ppm calcium carbonate.

As used herein, the moisture content, of a 100% fully rehydrated legume is the amount of water by weight of a dry clean legume that is obtained after the legume is soaked for at least 4 hours at ambient temperature in 90 ppm calcium carbonate water. The moisture content of the legume at 100% rehydration can be easily determined. A sample of clean dry legumes of known weight, such as 400 grams, is placed in a water bath containing 90 ppm $CaCO_3$. The sample is completely immersed in the water and is soaked at ambient temperature for at least 4 hours. When the soaking is completed the legumes are drained, i.e., the water is removed from the surface of the legume e.g., by draining or any other technique commonly used by the skilled artisan. The moisture content of the legumes in the water bath is determined by art recognized techniques and an average determined to obtain the average moisture content per legume at full hydration. This is the value used to measure the moisture content of a fully hydrated legume.

The water utilized in step 1 has the characteristics described hereinabove.

The legumes are preferably substantially immersed in the water bath. Sufficient amount of water is present in the water bath to effect the increase in moisture content of the legumes in the bath. More specifically, the weight ratio of water to legume is sufficient to rehydrate the legumes to attain the moisture levels described herein. Preferably, the weight ratio of water to dry legumes in step 1 ranges from about 1:1 to about 10:1, and more preferably from about 1:1 to about 8:1 and most preferably from about 2:1 to about 4:1.

As indicated hereinabove, the legumes are subjected to a first temperature, the temperature of the water bath being greater than or equal to ambient temperature but less than the critical rehydration temperature. The legumes are soaked in the water bath at the preferred temperatures under conditions effective to rehydrate the legume so that the moisture content of the legume is at least about 50% of that of a fully rehydrated legume.

As used herein, the "critical rehydration temperature" is that temperature at which dry legumes soaked in water weigh less than an identical batch of dry legumes soaked in the same water bath at a lower temperature. The critical rehydration temperature is characteristic of each species of legume. For example, the critical rehydration temperature for navy beans, as shown hereinbelow, is about 130° F. However, this value may be the same or different for another type of legume.

The critical rehydration temperature is either known or can be easily determined experimentally. For example, it can be determined by placing a sample of known quantity of dry cleaned legumes (e.g., 400 g) in a known volume (e.g., 2000 ml) of fresh soft water containing 90 ppm calcium and soaking the legumes for 30 minutes at various temperatures ranging from ambient temperature to about 150° F. After soaking for thirty minutes at each temperature, the water is removed from the surface of the legume (e.g., by draining or any other techniques commonly used by the skilled artisan), and the partially rehydrated legumes are weighed. The inventors noted that the weight of the 30-minute soaked legumes increases with increasing temperature until the critical rehydration temperature is attained. At the critical rehydration temperature, the weight of the 30-minute soaked legumes is less than the weight of an initially identical batch of, dry legumes soaked at a temperature lower than the critical rehydration temperature. Thus, the lowest temperature at which this loss of weight in the legume is observed is the critical rehydration temperature.

The following illustrates the concept. 400 g of dry navy beans were soaked at various temperatures in 90 ppm $CaCO_3$ water for 30 minutes. The weights were measured at the various temperatures.

The values are tabulated hereinbelow:

| SOAK WATER TEMP ° F. | WEIGHT OF 400 g DRY NAVY BEAN AFTER 30 MINUTES WASHING |
| --- | --- |
| 125 | 730 |
| 128 | 742 |
| 130 | 718 |

Since the weight of the navy beans at 130° F. is less than the weight at 125° F. and 128° F., it is readily apparent from the data that 130° F. is the critical rehydration temperature of navy beans.

Thus, the legumes are subjected to a temperature ranging from about ambient temperatures to a temperature less than the critical rehydration temperatures. Without wishing to be bound, it is believed that the critical rehydration temperature is the temperature at which new cell wall structure in the legume begins to form.

In a preferred embodiment, it is preferred that the temperature of the water bath ranges from about 90° F. to about 5° F. below the critical rehydration temperature of the legume and more preferably from about 95° F. to about 7° F. below the critical rehydration temperature of the legume. For instance, for legumes, e.g., navy beans, it is preferred therefore that the temperature of the water bath in the first step ranges from about ambient temperature to 130°, and more preferably from ambient temperature to 125° F., and even more preferably from about 90° F. to about 125° and most preferably from about 95° F. to about 123° F.

The soaking in the first step may be effected at one temperature or at more than one temperature, as long as the maximum temperature does not exceed the critical rehydration temperature, e.g., in navy beans, the maximum temperature should not exceed about 130° F. Thus, in this first step, soaking may be effected at two different temperatures, e.g., 95° F. and 123° F. As used herein when using the term first temperature, it is to be understood that the term encompasses one temperature or a plurality of temperatures within the specified range.

The amount of time required for the rehydration is dependent upon general factors, including, but not limited to the temperature of the water bath, the type of legume, age of the legume, storage condition of the legume and the like. Nevertheless, the soaking is conducted at this first temperature under the conditions described hereinabove until the moisture content of the legumes is at least 50% of that of an identical batch of fully hydrated legumes. It is preferred that the legumes are soaked at the first temperature for about 10 minutes to about 60 minutes and more preferably from about 45 minutes to about 60 minutes.

The soaking is conducted at the first temperature under the conditions described hereinabove until the legumes attain a moisture content of at least about 50% of that of a fully hydrated legume, as defined herein, and more preferably at least about 75% of that of a fully hydrated legume. The moisture content may be up to 100% or higher of a fully hydrated legume as defined herein. Preferably, the moisture content of the legume so treated ranges from about 85% to about 94% of a fully hydrated legume and more preferably from about 87% to about 97%. For example, in some legumes such as navy beans full hydration is typically 48%–55% by weight of the legume. Thus, it is preferred that in the first step the moisture content of the legume is increased to at least 35% and less than about 55% by weight, preferably about 40% by weight to about 50% by weight. In a more preferred embodiment, it is at least 45% by weight of the legume.

The first step also affects the textural quality of the legume; more specifically, the soaked, uncooked legume is noticeably softer, relative to the dry legume. Another effect is that the pH of the unbuffered soak water drops by about one pH unit.

However, it is critical that the temperature(s) of the first soak be within the temperature range described hereinabove. Heating the legumes to a higher temperature will have an adverse effect resulting in a product that does not have the characteristics described hereinabove.

Before being subjected to step two of the present process, the weight of the rehydrated legume is to be within the ranges described hereinabove. However, if after the optional preconditioning, the weight of the legume is within the ranges indicated in the first step, then the first step may be skipped, and the legume may be directly subjected to the conditions of the second step directly.

In step two of the present process, the rehydrated legumes prepared from the first step are heated to a second temperature which is greater than the first temperature but less than the inactivation temperature of the naturally occurring oligosaccharide reducing enzyme. As used in the present specification, the "inactivation temperature of the naturally occurring oligosaccharide reducing enzyme" is that temperature at which the enzyme is substantially inactive after soaking at that temperature for at least 4 hours. The inactivation temperature of the naturally occurring oligosaccharide reducing enzyme is either known to the skilled artisan or can be determined very easily by simple experimentation. For example, a known quantity of legumes, e.g., 400 g, is placed in a known volume of fresh soft soak water (e.g., 1600 ml at 90 ppm $CaCO_3$), at various temperatures between ambient and 160° F. for at least four hours at each temperature. At the end of the prescribed time, the water is removed from the legumes by techniques known to the skilled artisan, for example, draining the legume, and the like and the total oligosaccharides content in the legume is measured, by techniques known to the skilled artisan.

As the skilled artisan would predict, the percent of remaining oligosaccharides in the legume declines as the temperature increases until the inactivation temperature is achieved. However, the percent of oligosaccharides (by weight) in the "drained" legume after at least a 4 hour soak at the inactivation temperature of the naturally occurring oligosaccharide reducing enzyme will be significantly greater than the percent of oligosaccharide (by weight) from the same batch of dry legumes soaked at a temperature just below the inactivation temperature of the naturally occurring oligosaccharide reducing enzyme. Those skilled in the art recognizes that a naturally occurring enzyme system is most active across a narrow range of temperatures just below the inactivation temperature. For the purpose of this specification, the inactivation temperature is a temperature at which the enzyme's activity begins to decline, i.e., the lowest temperature that is greater than the highest temperature in the most active range. In other words, it represents the temperature at which the oligosaccharides remaining in the legume after soaking for at least 4 hours significantly increase relative to the concentration of oligosaccharides present in the legume of the lower temperature. Above the inactivation temperature, the enzymes become increasingly inactivated. The difference in value in percent oligosaccharide remaining in the legume just below the inactivation temperature and at the inactivation temperature is significant. For example, for purposes of illustration the inactivation temperature of the naturally occurring oligosaccharide reducing enzyme in navy beans was investigated using the above techniques. The following results were obtained. For purposes of illustration, the % oligosaccharides in the legume were measured at different times to show the generality of the trend:

|　| % Oligosaccharide remaining in navy beans after soaking | | |
|---|---|---|---|
| Soak Temp. | 4 hours | 7 hours | 24 hours |
| 100 | 1.19 | 1.02 | .36 |
| 110 | 1.04 | .79 | .18 |
| 120 | 0.81 | .42 | .06 |
| 130 | 0.44 | .22 | .10 |

| | % Oligosaccharide remaining in navy beans after soaking | | |
|---|---|---|---|
| Soak Temp. | 4 hours | 7 hours | 24 hours |
| 140 | 0.30 | .24 | .11 |
| 150 | 0.37 | .31 | .26 |

For navy beans, as shown by the data in the table, the optimum activity range for the endogenous oligosaccharide reducing enzyme is from 120° F. to a temperature less than 150° F. but greater than 140° F. From 120° F. to about 140° F., in all three cases, the % of oligosaccharides remaining in the legumes was at a minimum. However, between 140° F. and 150° F. in all three cases, the oligosaccharides remaining in the navy beans increased dramatically. Thus, the inactivation temperature for this enzyme in navy beans is between about 140° F. and about 150° F.

To further verify that the inactivation temperature of the enzyme was in the range indicated, navy beans were soaked at 150° F. for 24 hours, and the % oligosaccharide in the bean was periodically determined. The results are as indicated hereinbelow.

| TIME (HR) | % OLIGOSACCHARIDE REMAINING 150° F. |
|---|---|
| 0 | 1.63 |
| 1 | 0.89 |
| 4 | 0.37 |
| 7 | .31 |
| 10 | .29 |
| 24 | .26 |

The data clearly show that there is a dramatic decrease in the % of oligosaccharides remaining in the legume during the first four hours. However, after four hours, the oligosaccharide concentration in the legumes decreases much more slowly; this decrease is attributable to diffusion, as described hereinbelow.

Thus, in the second step in the process, the temperature is raised to permit the naturally occurring oligosaccharide-reducing enzyme in the legume to digest the flatulence-causing oligosaccharides. Thus, the soak water is heated to a temperature which is effective for the naturally occurring oligosaccharide reducing enzyme to digest the flatulence-causing oligosaccharides in the legume. It is preferred that the digestion occurs at the enzyme's maximum rate. The inventors have found that a preferred temperature ranges from about 125° F. to about 150° F. and more preferably from about 135° F. to about 150° F., with the most preferred temperature being about 147° F. As with the first step, the effective temperature may be one temperature or more than one temperature, as long as the maximum temperature is less than the inactivation temperature of the naturally occurring oligosaccharide-reducing enzyme. Therefore, as used herein when using the term "second temperature", it is to be understood that the term encompasses one temperature or a plurality of temperatures within the specified range, as defined herein, and as long as the temperature does not exceed the inactivation temperature of the naturally occurring oligosaccharide reducing enzyme.

However, it is believed that there are other phenomena occurring during this step. For example, without wishing to be bound, it is believed that some of the oligosaccharides in the legume are diffusing into the soak water. As one would expect, the rate of oligosaccharide diffusion from the legume into the soak water is concentration dependent as well as temperature dependent. It is greatest at the beginning of the step, but the rate decelerates as the soaking continues and as the amount of oligosaccharides that remain in the legume approaches the amount in the soak water. It should also be noted that as the concentration of oligosaccharides in the soak water increases, oligosaccharides will be diffusing back into the legume, with the rate of diffusion of oligosaccharides back into the legume increasing as the concentration of oligosaccharides in the soak water increases. In addition, enzymes are concurrently reducing the oligosaccharide concentration in the legume. At equilibrium, the two rates of diffusion are about the same. Equilibrium, however, is achieved substantially quicker than if diffusion were the only means of reducing the concentration of sugars in the legumes as a result of the enzymatic digestion of the sugars in the legume. Nevertheless, at equilibrium, the oligosaccharide concentration in the soak water does not increase. Thus prior to equilibrium, the sugar concentration in the legume is being reduced by two different mechanisms: diffusion and enzymatic reduction.

The amount of oligosaccharides that diffuses out of the legumes into the soaking water can be determined by art recognized techniques. For example, the total amount of the oligosaccharides present in the various legumes is generally known. For example, it is known that the common bean contains 4.90% (w/w) sugar, 1.25% (w/w) sucrose, 0.45% (w/w) raffinose, 1.80% (w/w) stachyose, and 0.25% (w/w) verbascose. The oligosaccharide content of other common legumes are listed in a table on Page 27 in S. S. Abdel Gawad, *Food Chemistry* 1993, 46, 25–31, the contents of which are incorporated by reference. The amount of oligosaccharide leached from the legume, e.g., bean, is determined by measuring the oligosaccharides present in the soak water or in the legume at various time intervals during the successive soak by techniques known in the art, such as by liquid chromatography. Id.

The legumes are maintained at this second temperature for a sufficient amount of time to permit the remainder of the flatulence-causing oligosaccharides present in the legume to be substantially removed. It is preferred that the oligosaccharide concentration in the legume product produced by the present process especially the flatulence-causing oligosaccharides, is less than about 0.5% by dry weight of the legume, and more preferably less than 0.05% by dry weight of the legume and most preferably about 0% by weight. Moreover, it is preferred that the concentrations of the verbascose and raffinose are about 0% by weight of the legume and that the concentration of stachyose is less than about 0.5% by dry weight of the legume and more preferably less than 0.05% by dry weight of the legume. The effective conditions are those described herein so as to permit the naturally occurring enzyme in the legume to digest a substantial amount of the remaining flatulence-causing oligosaccharides present in the legume, while simultaneously permitting additional flatulence-causing oligosaccharides to diffuse into the soak water.

The present inventors have found that the enzymatic digestion of the oligosaccharides is most effective when the pH of the soak water is about or near neutral or slightly basic. More specifically, it is preferred that the pH of the water bath ranges from about 5.5 to about 9.0 and more preferably from about 6.0 to about 9.0 and most preferably from about 6.5 to about 7.5. In order to maintain the pH within these ranges, a buffer known to the skilled artisan may optionally be added to the soak water in amounts effective to maintain the pH in the range indicated under the conditions of the second step of the present process. If a buffer is utilized, it is preferred that it is prepared using soft water and more preferably water which is substantially calcium free. However, a buffer is usually not present, since during the process of the present invention, the pH is normally in the ranges specified hereinabove.

The inventors have found that the time and temperature of the first step materially affects the ability to remove oligosaccharides in the second step and the activity of this naturally occurring enzyme. If rehydration is allowed to proceed substantially to completion in the first step, the activity of this enzyme unexpectedly reaches a kinetic plateau at temperatures less than its inactivation temperature. Without wishing to be bound, it is believed that if the soaking in the first step is effected in accordance herewith, the legume is sufficiently swelled, so then when heated to the second temperature in the second step, freer moisture migration is permitted within the legume. If, on the other hand, the legume is rehydrated at a higher temperature than the critical rehydration temperature, such at temperatures wherein internal structure is formed, for example, by calcium pectate formation or by partial protein coagulation, then the subsequent rate of oligosaccharide removal is slowed.

The soaking in the second step is effected by permitting the legumes to soak with or without stirring. If the legumes are mixed or stirred, agitation or mixing is effected by using a stirring device known in the art. Water may be either stagnant or flowing. Although the water utilized may be the soaking water used in the first step, fresh water may be added or the soak water from the first step may be partially or fully replaced with fresh water. If freshwater is utilized, it may contain mineral salts. However, it is preferred that the fresh water used is tap water, deionized water, soft water or distilled water or combination thereof. If tap water is utilized, it is preferred that soft water be utilized. It is preferred that the amount of calcium present in the fresh water is minimal; in fact, the attributes of any fresh water utilized in this second step described hereinabove are those described hereinabove for the water source for the second and third steps of the present process.

Again, it is preferred that the legumes be substantially immersed in the water. The water to legume weight ratio may be the same or different than that utilized in the first step.

Thus relative to the re-hydrated legumes formed in the first step, it is preferable that the weight ratio of water to legumes ranges from about 2:3 to about 5:1; and more preferably from about 2:1 to about 4:1. In a most preferred embodiment, the ratio is about 4:1.

At the end of the second step, substantially all of the oligosaccharide concentration, especially the flatulence-causing oligosaccharide in the legume seed has been removed. By "substantially", it is meant that at least 90% of the oligosaccharide (especially the flatulence-causing oligosaccharide) content has been removed from the legume seed, and more preferably greater than 95% and most preferably greater than 99% of the oligosaccharide, (especially the flatulence-causing oligosaccharide) content has been removed from the legume seed. It is preferred that after the second step of the present process, the oligosaccharide, (especially the flatulence-causing oligosaccharide) content in the legume is about 0%.

It is preferred that the soaking legumes, e.g., navy beans will achieve the above-identified oligosaccharide level after heating the soaking legume at the second temperature within about 5 hours, and more preferably within about 4 hours. It is also preferred that the soaking legumes, e.g., navy beans be heated at the second temperature for at least about 1 hour and more preferably for at least about 2 hours. It is preferred that the soaking legumes, e.g., navy beans be heated at the second temperature for about 1.5 to about 5 hours, more preferably from about 2 to about 4 hours and most preferably for about 3.5 hours. For some of the large legumes, however, the preferred soaking times for the second step may be increased.

It is to be noted that the legumes may be soaked in the water for times longer than that indicated hereinabove, especially if the soaking occurs at lower temperatures, for heating increases the rate of oligosaccharide removal. If the legumes are soaked for more than the above-specified time, the present process would become less efficient. However, the present inventors have found that as the amount of soak water increases, the greater is its holding capacity for the leached components, i.e., the flatulence-causing oligosaccharides as well as other solubles, e.g., calcium. In addition, the greater the amount of soaking water present, the greater is the initial amount of sugar leached from the legume. The present inventors have found that if too much water is added, however, the process starts to become less efficient, and there is relatively little additional benefit to use water in those amounts. Thus the effective conditions are such so as to permit the naturally occurring oligosaccharide reducing enzyme to digest flatulence-causing oligosaccharides present in the legume, while simultaneously permitting the oligosaccharide concentration in the soak water to increase by diffusion of the sugar into the soak water from the legume.

During the second step of the process, it is preferred that the water bath be changed with fresh water at least once, as described hereinbelow; it is more preferred that the soak water in the second step be changed twice or thrice, as described hereinbelow.

Next the legumes in the soak water are heated to a third temperature, which is higher than the first and second temperatures but is below the temperature at which substantially all of the protein in the legume around the starch wall coagulates and below blanching temperatures. These values are known to the skilled artisan. The third temperature may be at or above the initial starch gelation temperature which is either known or determined by the procedure described herein. The maximum temperature for the third step is less than the maximum starch gelation temperature and below blanching temperatures.

The initial starch gelation temperature of various legumes is well known. See, e.g., an article by Schoch and Maywall in *Cereal Chem.* 1968, 45, 564–569, the contents of which are incorporated herein by reference. For example, for navy beans, it is about 154° F. These temperatures are specific for each species of legumes and are either known or can be determined experimentally. For example, a sample of the legumes of measured quantity (e.g., 400 g) is placed in an adiabatic water bath containing a thermometer, whereby the temperature of the water bath is controlled by a thermostat or other equivalent means known in the art. The water bath is heated to the inactivation temperature of the naturally occurring oligosaccharide reducing enzyme. The thermostat or other control is raised a small amount, for example, in increments of 5° F. and time is permitted to allow the temperature of the soak water to be equal to the set temperature. The temperature of the soak water is then raised again, for example, up to 5° F., to allow the legume to again achieve thermodynamic equilibrium. When the temperature of the soak water equals the set temperature, this process is repeated until the temperature of the soak water is raised to 170° F. The inventors have noted that when the legume is heated in such a controlled manner, as in a stepwise fashion, as outlined above, the legume undergoes endothermic and/or exothermic enthalpy reactions. If the legumes undergo exothermic or endothermic reactions, these are observed almost immediately as the temperature of the water bath is increased in a step-wise fashion. More specifically, if the legumes are heated in a stepwise fashion as described herein, it is noted that at some temperature(s) in the range, the temperature of an adiabatic water bath decreases for a period of time, until it reaches a minimum and then the temperature increases until the temperature reaches the initial set temperature. Alternatively, the temperature of the bath may increase dramatically and then decrease to the set temperature. When the water bath is undergoing this temperature fluctuation, the set temperature is not raised. Once the temperature of the water bath is stabilized and equals the set temperature, the water bath is heated in another controlled fashion e.g., up to 5° F. intervals. This process is repeated until no more fluctuations in temperature of this sort described hereinabove are observed or until the soak water is about 170° F. As used herein, unless known to the skilled artisan, the term the initial gelation temperature is the temperature at which the enthalpy fluctuations described hereinabove first occurs. In a preferred embodiment, the third temperature ranges from about 145° F. to about 165° F. and more preferably from about 147° F. to about 155° F. and most preferably from about 149° F. to about 153° F.

The inventors noted that these temperature fluctuations are observed in the adiabatic water bath as the temperature of the soak water is raised until the temperature of the water is equal to about the temperature at which the protein in the legume coagulates, at which point, the temperature of the soak water acts normally, and the temperature increases proportionally to the amount of heat added.

There may be more than one temperature in which the enthalpy fluctuations occurs. Thus, in a preferred embodiment of the present invention, the temperature of the water bath in the third step is within 5° F. of each temperature in which the enthalpy transition was observed and most preferably the temperature of the water bath is at observed enthalpy transition temperatures.

These temperature fluctuations are specific for each variety of legume but may differ among different varieties. However, more than one variety may exhibit the enthalpy transitions at the same temperature.

In a preferred embodiment, once this temperature at which the enthalpy fluctuation is determined, the legumes are heated at those temperatures or within 5° F. of these temperatures, for a time sufficient to permit initial gelatinization of the gelatinizable starch in the legume, i.e., at a time sufficient to permit these enthalpy fluctuations in the legume described hereinabove to occur at each temperature. Preferably, the legumes are heated at the temperatures described hereinabove in the third step from about 2 minutes to about 40 minutes and more preferably from about 5 minutes to about 10 minutes at each temperature.

When using the term "third temperature", it is to be understood that the term encompasses one temperature or a plurality of temperatures within the specified range defined hereinabove.

The inventors noted that when the legumes are heated to the temperature within the range indicated hereinabove that substantially all of the gelatinizable starch in the legume is gelatinized. That is, when the legumes are heated to the third temperature, as defined hereinabove, substantially all of the crystalline discrete starch granules in the legumes are converted into unstructured amorphous gels. By substantially all of the starch being gelatinized, it is meant that at least about 80% of the starch and more preferably at least about 85% and even more preferably about 90% and most preferably, about 95% of the starch granules in the legume is gelatinized. It is the amorphous starch which is easily digestible by the mammal, while the crystalline starch is not digestible; thus the greater the amount of gelatinization, the less flatulence that results by when ingested by mammals.

On the other hand, when the legumes which were subjected to the conditions in steps 1 and 2 were not subjected to this third step, the legumes so produced had significantly more starch granules in the crystalline form.

Without wishing to be bound, it is believed that these fluctuations in temperature coincide with changes or reactions occurring in the legume itself. In other words, it is believed that each endothermic or exothermic change is accompanied by some change in the legume, and that each such energy change continues until the change or reaction is complete. Without wishing to be bound, it is believed that each such exothermic temperature fluctuation represents a change in a region of coagulated protein structure around the starch, which results in a decrease in the propensity of the starch in that region to gel. Alternatively, without wishing to be bound, it represents an endothermic or exothermic transition change in a region in the starch in which that region is beginning to transition to the amorphous gel and substantially reaches thermodynamic equilibrium, at which point, the temperature of the water bath returns to the normal temperature. Thus, without wishing to be bound it is believed that these temperature fluctuations coincide with physical and/or chemical transformations occurring in the legume. Some of these changes occur concurrently.

Without wishing to be bound, it is believed that the protein around the starch effects the ability of the starch to fully swell and gelatinize. If the protein aggregates or coagulates, it is believed, without wishing to be bound, that it functions as a physical and water restricting barrier which traps the starch granules and prevents full swelling thereof. If, on the other hand, the protein remains soluble, the water can diffuse therethrough to the starch granules. In this situation, the proteins in the matrix have less of a tendency to coagulate or aggregate, and as a result, the starch granules are permitted to more fully swell at gelation temperatures.

Thus, without wishing to be bound, it is believed that when the legume is not subjected to the third step of the present process, the protein around the starch prematurely coagulates and aggregates, forming a barrier around the starch and resulting in decreased diffusion of water, thereby preventing the starch granules to swell.

As a result, the starch remains crystallized and/or entrapped and therefore cannot be attacked by the digestive enzymes in the digestive tract of the mammal, when the legume is ingested. This undigested starch passes into the stomach and then into the lower intestine and is anaerobically fermented by the microbes in the lower bowel, forming flatus. If, on the other hand, when the legumes are subjected to the third step, it is believed, without wishing to be bound, that the starch and/or protein undergo physical changes, which permit the starch to maximally swell.

Without wishing to be bound, it is believed that the conditions of the present process described hereinabove effect a greater percentage of gelatinization of the starch when the temperature of the legume is raised to gelatinization temperatures, greater penetration of the water into the starch granules, increased separation of more starch chains, longer segments of starch chains to form, increased randomness in the general structure of the starch, and decreased number and size of crystalline regions in the cell wall relative to legumes prepared by conventional methods.

The present inventors have found that once the temperature is raised above the third temperature(s), the endothermic or exothermic reactions described hereinabove are not observed, even if the temperature is subsequently lowered and heated slowly through the range of temperatures in the third step, as described hereinabove.

During this step, the pH of the unbuffered water drops, preferably about 0.5 to about 1.5 pH units less than the water utilized to soak the legumes.

Alternatively, the third step may be effected by immersing the legumes in an adiabatic water tank described hereinabove and heating the legumes stepwise from the inactivation temperature of the oligosaccharide reducing enzyme at predetermined temperature increases, e.g., 5° F. temperature increases. If an endothermic and/or exothermic enthalpy change were observed, then the legumes were maintained at that set temperature until the temperature of the water temperature was about equal to the set temperature, after which the temperature was raised by another predetermined amount, e.g., about 5° F. If there was no enthalpy fluctuation observed, then the temperature of the water bath was raised by another predetermined amount, e.g., 5° F. This process was continued until no more endothermic and/or exothermic enthalpy changes were observed.

The next step, step 4 in the process, is optional; the legume may optionally be blanched under effective blanching conditions. The present inventors have found that the blanching temperature is below the boiling point of water. Preferably, if conducted, the blanching is performed at temperatures ranging between about 155° F. to about 210° F. and more preferably from about 165° F. to about 190° F., and most preferably from about 170° F. to about 185° F. Blanching may be effected at one temperature or more than one temperature within the effective range. When using the term "fourth temperature" it is to be understood that the term encompasses one temperature or a plurality of temperatures as defined herein. Similarly, when using the term blanching effective conditions it is to be understood that the term encompasses soaking the legumes at one temperature or more than one temperature as defined herein. These blanching temperatures are maintained for a time sufficient to ensure that the entire legume is maintained at that temperature. The legumes are preferably blanched for a period of time in the range from about 1 to about 20 minutes, and more preferably from about 2 to about 10 minutes and most preferably from about 3 to about 7 minutes.

The legumes after step 4 are firmer than prior to step 4. The pH of the unbuffered water in step 4 is about the same as that of step 3.

Without wishing to be bound, it is believed that during the blanching step, many different phenomena are occurring. In the blanching step, it is believed, without wishing to be bound, that the pectin methyl esterases (PME) are denatured and rendered ineffective. As described hereinbelow, it is believed, without wishing to be bound, that the PME catalyzes the reaction of calcium with the endogenous pectin present in the legume, in both the skin and meat of the legume, forming calcium pectate cross-links. These cross-links are impermeable to water and form a barrier that inhibits migration of material to and from the legume. Moreover, it is believed, without wishing to be bound, that PME catalyzes the formation of calcium crosslinks on the outside of the starch granule, thereby also preventing the starch granules from fully gelatinizing. Thus, by inhibiting the PME, it is believed, without wishing to be bound, that the starch granules can more freely swell with less hindrance.

Concurrent with the PME denaturation, it is believed that two other reactions of significance occur, continuing starch gelatinization and protein coagulation. During the blanching step, the starch granule begins to swell as it transitions from a crystalline granule to an amorphous gel, making the legume more digestible. In addition, protein coagulation occurs concurrently or shortly thereafter. This protein coagulation is important in preventing the starch from excessively leaching out of the legume during the subsequent processing operation. As described hereinabove, there may be some starch leach from the legume during the subsequent preserving step, however, the conditions of this step are such so as to prevent an excessive amount of starch to leach from the legumes. Thus, the legumes are also subjected to a temperature effective to coagulate a sufficient amount of protein to prevent an excessive amount of starch from leaching out of the legume during the subsequent preserving steps.

During the present process described hereinabove, the present inventors have found that the water may be changed during and after any step of the present process. It is preferred that the soak water is changed at least once, especially if the oligo-saccharides in the soak water begin to diffuse back into the legume. Although it is optional to change the soak water after the first step of the present process, it is preferred that the soak water be changed at least once and more preferably at least two times and most preferably at least three times during the second step, especially when the concentration of the sugar in the soak water begins to decrease. As indicated hereinabove, during the second step, there are at least two phenomena occurring. First, the flatulence-causing oligosaccharides are diffusing out of the bean. As long as there is a larger concentration of the oligosaccharides in the legume than in the soak water, the oligosaccharide concentration in the soak water will increase from the diffusion thereof from the legume to the soak water. This differential in concentrations between the legume and the soak water is the driving force for the diffusion. More specifically, the driving force for diffusion is to transfer soluble solids from high concentration zones to lower concentration zones. For purposes of discussion herein, if oligosaccharides are diffusing from the legume to the soak water, so that the net concentration of oligosaccharides in the soaking water increases, it is called a positive diffusion. Moreover, for purposes of discussion, this differential in oligosaccharide concentration in the legume relative to the soak water permitting the positive diffusion to occur is termed "a positive oligosaccharide concentration reduction driving force." As more and more oligosaccharides diffuse from the legume, the concentration of the oligosaccharides in the soak water begins to approach the concentration of the oligosaccharides in the legume and the rate of diffusion slows down.

However, there is a second phenomenon also occurring. The naturally occurring enzyme in the legume is digesting the oligosaccharides, which form simple sugars therefrom, thereby reducing the concentration of oligosaccharides in the legume. Thus, the remaining flatulence-causing oligosaccharide in the legume will decline as the leaching action and enzymatic activity progress. At some time, the sugar content in the soak water will be approximately equal to the sugar content in the legume. At that point, as the skilled artisan will realize, the sugar concentration in the legume will decrease below the sugar concentration in the soak water with continuing enzymatic activity. Once the concentration of these sugars in the legume drops below the sugar concentration in the soak water, the sugar in the soaking water will diffuse back into the legume because the driving force has reversed. The diffusion from the soak water back to the legume, causing a net decrease in the sugar concentration in the soak water, is called a negative diffusion.

Although the soak water can be changed any number of times to make the present process more efficient, it is preferred that the soak water be changed only when necessary, i.e., at the time when the concentration of the sugar in the soak water begins to decline. This makes the process of the present invention more efficient and permits additional oligosaccharides to continue to leach from the legume into the soak water, thereby maximizing the amount of flatulence-causing oligosaccharides originally in the legume to leach into the water bath. For example, if the same soak water were utilized during the entire process of steps 1–4, once an equilibrium between the oligosaccharides in the legume and in the soak water is attained, no more oligosaccharides can be leached from the legume into the soft water, thereby limiting the amount of sugar being leached from the legume. By changing the soak water, especially when equilibrium with respect to the sugars in the soak water and the legume is attained, additional amounts of oligosaccharides can be leached from the legume into the water bath. Under the conditions of the present process, however, it is not usually necessary to change the soak water until some time during the second step of the process.

This point whereby the sugar concentration in the soak water begins to decrease can be determined by measuring the brix. Brix is a well known refractive index measure of the soluble solids, e.g., sugars, in a liquid. As the sugars are diffusing out of the legume into the soak water, the concentration of the sugar increases, and the brix increases. However, when the concentration of the sugar in the soak water is higher than that in the legume, the sugar in the soak water begins to diffuse back into the legume, and the brix of the soak water begins to decrease. Thus, when the brix of the soak water is first noticed to decline, then it is necessary to change the soak water.

The new soak water will have initially a zero concentration of sugar and thus, there is a positive driving force again for the sugars to be leached from the legume into the soaking water.

Thus, during the entire process, and especially during the second step, it is preferred that there is a continuous and periodic monitoring of the brix in the soak water to determine when the brix of the soak water begins to decline so that the soak water can be changed. It is preferred that the brix be measured at least once every 60 minutes, and more preferably within every 30 minutes.

The present inventors have found that changing the water bath after step 3 has little effect on the digestibility of the legume. However, if the water is optionally changed after step 3, or if fresh water is added to the water bath, it is preferred that hard water be used because the calcium content of the hard water gives the legume added firmness and fixes the weight gain in step 4. In steps 1, 2 and 3, the legume is intentionally over-tenderized to achieve maximum starch swelling. Then, if the soak water is optionally changed or if fresh water is added thereto, after step 3, hard water is utilized to intentionally firm the legume in step 4 to achieve the desired firmness. Alternatively, calcium can be added to the sauce or other vehicle prior to or simultaneous with forming a legume-based mixture in a later step to achieve the desired firmness, as described hereinbelow. Those skilled in the art will realize that the degree of hardness can be adjusted to achieve the desired tenderness.

Finally, the present inventors have found that the process of these first four steps must be performed in the order given hereinabove. More specifically, the oligosaccharide reduction step must proceed starch gelation step, as defined herein.

The conditions of the present process described hereinabove has another effect, it leaches out calcium. It is to be noted that calcium is being leached from the legume during steps 1,2 and 3 described hereinabove.

Without wishing to be bound, it is believed that calcium plays a previously unrecognized key role in producing flatulence caused by digestion of legumes. Calcium is naturally present in legume seeds.

Without wishing to be bound, it is believed that the calcium concentration in the legume affects the amount of starch gelatinization. Starch is about half of the legume, and it is stored in very small, crystalline granules, surrounded by a protein-rich layer. The protein rich layer contains pectin. The protein and starch granules are embedded in a two layer membrane, i.e., a phospholipid bilayer. The bilayer determines the basic structure of the membrane and acts as a barrier to general diffusion of materials into and out of the cells in the legume, including calcium. However, it is believed, without wishing to be bound, that heating causes disruption of the cell membrane, allowing calcium to transport across the cell membrane and bind with pectin in a reaction catalyzed by pectin methyl esterase enzyme resulting in pectin insolubilization and cell wall strengthening. Normally, during heating, it is believed that calcium also binds with the outside of the starch granule. This binding restricts the gelation and swelling of some of the starch. As a result, some of the starch in the digestive tract of the mammal is not available for attack by the digestive enzymes. This undigested starch passes into the lower bowel and is anaerobically fermented, causing flatulence.

It is believed that the various steps in the present process, especially the first and second steps in the process described hereinabove, affect the removal of sufficient amount of calcium from the legume to effectively facilitate starch gelation and retard starch crystallization. By hydrating at the temperatures described in steps 1 and 2 hereinabove, excess calcium is leached from the legume into the soak water. By changing the soak water and discarding the soak water, additional calcium leaches out. If there is a second additional change of soak water, even more calcium will be removed from the legume.

Raising the soak water to the third temperature, i.e., at or above the initial starch gelation temperature and below the rigid-cell-structure-formation temperature, will allow the legume to swell. By so doing, the previously-adjacent-reactive cell wall structure is now not able to react with residual or even added calcium to block in vivo digestion of the starch because the reactive sites are swollen farther apart than calcium can bridge.

Thus, soaking the legumes in the first, second and third steps in accordance with the present process effectively promotes gelatinization of the starch and retards stiffening of the protein rich layer surrounding the starch in the cell wall.

After being subjected to steps 1–3 and optionally step 4 of the present process, the legumes are ready to be preserved. The usual type of preservation includes canning, freezing, drying, and the like. Initially the legumes so prepared are combined with a vehicle, as defined hereinbelow and mixed with optional ingredients, depending on the purpose, using standard techniques in the art. The legumes may also be used whole or crushed or mashed using techniques known in the art. Nevertheless, regardless of the preservation technique, the legumes are combined with a vehicle to produce a legume-containing mixture. The mixture may additionally contain foods typically included in such mixtures, e.g., meat, vegetables, and the like. Of course, the amount of legumes in the legume-containing mixture will depend upon the particular product being produced. Examples of legume-containing products that can be prepared by the process of the present invention include, but are not limited to, pork and beans, vegetarian beans, hot dog and beans, sausage and beans, chili with beans, baked beans, pre-cooked ingredient beans, bean salad, southern peas, bean soups, beans with meat, bean spreads, beans with cheese, beans with rice, flavored beans, beans with pasta, bean dips, bean casseroles, bean salsa, bean snacks, bean pastes, bean side dishes, bean flour, re-fried beans, bean powder, pet foods and the like; however pork and beans, chili with beans, and baked beans are preferred. The legume containing mixture preferably comprises from about 5% by weight to about 95% by weight and more preferably from about 15% by weight to about 75% by weight and most preferably from about 35% by weight to about 65% by weight of the legume produced in accordance with the present invention, with the balance being a vehicle.

When the legume-containing mixture is the preferred pork and beans, the mixture preferably comprises from about 25% by weight to about 85% by weight, more preferably from about 30% by weight to about 75% by weight, and most preferably from about 35% by weight to about 65% by weight of beans, prepared in accordance with the process described hereinabove, and the balance being the vehicle; when the legume-containing mixture is the preferred baked beans, the mixture preferably comprises from about 25% by weight to about 65% by weight, more preferably from about 40% by weight to about 60% by weight, and most preferably from about 35% by weight to about 50% by weight of beans, prepared in accordance with the process described hereinabove and the balance being the vehicle; when the legume-containing mixture is the preferred chili with beans, the mixture preferably comprises from about 10% by weight to about 40% by weight, more preferably from about 15% by weight to about 35% by weight, and most preferably from about 20% by weight to about 30% by weight of beans, prepared in accordance with the process described hereinabove, with the balance being the vehicle. These legume-containing mixtures may further comprise other ingredients, in addition to the foods described hereinabove, which are typically included in such mixtures. These type of ingredients and their relative concentrations will be known to one skilled in the art.

The term "vehicle," as used herein, refers to an edible medium that the legumes prepared in accordance with the present invention may be combined with. The vehicle can be any edible medium known to those skilled in the art. Furthermore, the vehicle may be a single component or ingredient, such as water, or may be a mixture of components or ingredients. Preferably, the vehicle is compatible with the particular legume prepared in accordance with the present invention being used. Examples of vehicles useful in the present invention include, but are not limited to, water, brine, a tomato-based sauce, a molasses based sauce, a brown sugar based sauce, chili sauce, barbecue sauce, smoke-flavored sauce, and baked bean sauce. The phrase "tomato-based sauce", as used herein, refers to the sauce used to prepare products such as pork and beans, hot dogs and beans, and vegetarian beans. The composition of such tomato-based sauce will be appreciated by one skilled in the art. The phrase "chili sauce", as used herein, refers to the sauce used to prepare chili-type products when combined with beans. The composition of such chili sauce will also be appreciated by one skilled in the art. The phrase "baked bean sauce", as used herein refers to the sauce used to prepare baked bean products when combined with beans. The composition of such baked bean sauce will also be appreciated by one skilled in the art.

The legume-containing mixture may additionally contain optional ingredients such as pork, beef, chicken, tofu or other soy derivatives, turkey, fish, spices, flavoring agents, tomato derivatives, dairy derivatives, grains, gums, starches, sugars, coloring agents, oils, salts, fruits, vitamins, vegetables, cereals, calcium sources, such as calcium chloride, phosphates, and mixtures thereof and the like. The concentration of each and all of these optional ingredients will depend upon the desired flavor profile and appearance of the final product, and will be appreciated by one skilled in the art.

The legume-containing mixture is prepared by combining the legumes prepared in accordance with the process described hereinabove with the vehicle, along with any desired optional ingredients. The ingredients may be added singularly or combined in any manner known to those skilled in the art. The preferred embodiment is to separately add each ingredient into a vessel or container and mix them together. Thus, for example, the legumes prepared in accordance with the present invention, then other fresh ingredients, such as chopped onions or pieces of pork, and then the vehicle are sequentially added into a container. Another method is to add the various ingredients, separately or in combination, into an agitated tank, wherein they are stirred or agitated until the ingredients are uniformly dispersed through the legume-containing mixture. If necessary, to increase the firmness of the vegetable, sufficient calcium may be added to the legume containing mixture until the desired firmness is obtained.

After the legume-containing mixture is prepared, it is then preserved by the desired route using conventional techniques known in the art. For example, various methods known in the art are used to preserve the legume-containing mixture, such as retorting, refrigeration, irradiation, freezing, aseptic processing, microwave processing, dehydration, freezing-drying, acidification, pickling, and the like. For example, in freezing, the freezing may be accomplished by known techniques in the art, e.g., individually quick frozen techniques, freezing the legume in a container, e.g., blast freezing or immersion of the legumes into a freezing solution. In dehydration, water is removed from the legumes by applying heat thereto, using techniques known in the art, such as forced air drying, drum drying, spray drying, vacuum drying, freeze drying and the like. Heating may also be effected by solar heating techniques known in the art. It is preferred that the legumes are dried in dehydrators. If dehydration is utilized, it is preferred that before dehydration, preservatives, such as sulfite (e.g., sodium sulfite or metabisulfite) be applied to any cut legume.

However, the most preferred preservation route is retorting. In this method, the legume-containing mixtures described hereinabove are charged into a container. Examples of typical containers include, but are not limited to, tin plates or steel cans with or without enamel linings or coating, aluminum cans, flexible or semi-rigid containers, glass bottles and jars, plastic bowls with or without lids, coated cartons, aluminum trays, flexible pouches, retortable containers and the like. The phrase "retortable container", as used herein, refers to a container which is capable of withstanding the temperature and conditions of a retort operation. The preferred container is the retortable container. The retortable container may be any type suitable for retort processing.

In the retorting method, the legumes are thermally processed in a retortable container. More specifically, in the preferred embodiment, after the legume-containing mixture is prepared, it is charged into a retortable container, then sealed. After the retortable container is sealed, it is thermally processed. This is accomplished by heating the retortable container and the legume-containing mixture contained therein at a sufficient temperature and for a sufficient period of time to thermally process the legume. The time and temperature requirements are dependent upon the legume-containing mixture being thermally processed and the size, shape and composition of the retortable container, and the type of retort equipment used, which is easily determined by one skilled in the art.

The retort operation can be carried out in any retort equipment known to those skilled in the art. Examples of useful retort equipment include, but are not limited to, hydrostatic retorts, crateless retorts, rotary retorts, agitating retorts, and still retorts. As will be appreciated by one skilled in the art, and as already pointed out herein, the time and temperature parameters necessary to prepare the legume product will depend upon the type of retort equipment used.

Optionally, prior to retorting, the open retortable containers are filled with legumes prepared in accordance with the present invention in combination with the vehicle, and are placed on a conveyor of any suitable style and passed through an oven, as described in U.S. Pat. No. 1,718,187 to Bartlett, the contents of which are incorporated by reference. The temperature of the oven is preferably between 400° F. and 500° F. and more preferably at or about 450° F., and the legumes are subjected to the high heat of the oven for a time sufficient to sufficiently bake the legume in the open containers. Upon removal of the containers from the oven, a quantity of the vehicle is added to each container sufficient to compensate for vehicle lost by evaporation and absorption during the baking steps and sufficient to meet fill standards. The containers are next hermetically sealed and then thermally processed under retorting conditions known to the skilled artisan. Other methods for processing the legumes, sealing the container and preserving the contents thereof are described in U.S. Pat. Nos. 2,232,282 to Struble, U.S. Pat. No. 1,495,736 to Hadley, U.S. Pat. No. 1,548,796 to Libby, U.S. Pat. No. 2,278,475 to Musher, and U.S. Pat. No. 2,360,062 to Lannen, the contents of which are all incorporated by reference.

After retorting, the retortable containers are labeled and ready for distribution to the consumer.

As indicated hereinabove, the legumes may be prepared into a paste or puree. This is effected using techniques well known in the art. See U.S. Pat. No. 4,871,567, the contents of which are incorporated by reference. For example, prior to retorting and after the optional baking step described hereinabove, the legumes may be crushed or mashed using techniques known in the art.

In addition, the crushed legumes may be mixed with whole legumes, such as in preparing refried beans. In preparing refried beans, the beans subjected to steps 1–3 and optionally step 4 described hereinabove are separated into two separate streams. One stream consists of the whole beans; while the other stream consists of the beans which are to be crushed or mashed. The first stream of beans, (i.e., the beans which are to remain whole) may optionally be baked under normal baking condition.

The second subquantity of beans (beans to be crushed) are subjected to crushing using standard techniques in the art. After crushing, the second subquantity of beans is mixed with the first quantity of beans and then dried using techniques known in the art, such as that described in U.S. Pat. No. 4,871,567, the contents of which are incorporated by reference.

The legumes prepared by this invention can be used in foods fed to various kinds of mammals, including dogs, cats and other domestic and farm animals. However, preferably they are prepared for ingestion by man.

The legumes prepared in accordance with the procedures described hereinabove exhibit the characteristics described hereinabove, with legumes exhibiting very low flatulence.

The inventors have noted that when the soak water in steps 1–3 described hereinabove is changed abruptly, i.e., when the old soak water is removed completely and then replaced with fresh water, the legumes develop increased and noticeable severe cracking (splitting) in the skin. (Normally, per 100 legumes, e.g., beans, there may be about 15% by count with severe cracking.) However, under these circumstances, when the soak water is changed abruptly, the amount of cracking increases substantially e.g., 50% cracking, which is readily observable when the soak water has been changed abruptly. However, when the soak water is changed gradually, excessive cracking in the legume does not occur or is substantially diminished. Thus, in a preferred embodiment, the legumes are soaked in a soak tank which has an outlet drain for water and an inlet for water to be added wherein the rate of entry and outlet of the soak water is controlled. Without wishing to be bound, it is believed that this is due to the following phenomena: When the legumes are soaking in the present process, the legume is swelled with water. At the same time, there is considerable amount of sugar in the soak water as well as other components in the soak water. If the fresh water replaces the old sugar containing water abruptly, e.g., by dumping out the soak water and then replenishing the water, there is a considerable change in the soak water brix, e.g., from a positive amount to zero. This represents a considerable change in osmotic pressure. This abrupt change in pressure pushes excess water into the legume, swelling it even further. If the swelling rate is excessive, the legume skin stretches beyond its yield point and creates a weakness in the skin. However, the swelling is temporary as the interior sugar migrates out of the legume and into the soak water, resulting in excess water being expelled by the legume.

However, at high osmotic pressure differences, the swelling/deswelling response is so great that permanent damage is done to the integrity of the legume surface. Although the damage is not obvious to the naked eye during soaking, after, being subjected to preserving conditions, such as retorting which completes gelation swelling, the damage is visually apparent as increased equatorial fractioning of the legume. If the legumes, such as beans are ultimately served as a puree or paste, the presence of cracking in the legumes is unimportant, since in puree, the legume is mashed in any event, as described hereinabove.

On the other hand, if the legume is not to be mashed, then "cracking" detracts from the texture and appearance of the legume. To avoid excessive cracking in the legume, it is preferred that the soak water is changed gradually. More specifically, the fresh soak water is added to the soak tank or container at a rate effective to minimize cracking. Preferably, the fresh soak water is added to the soak tank at a rate ranging from about 1%/min to about 10% min. In this case, percent per minute means the fresh gallons added per minute divided by the total free gallons of water in the soak and balance tank system. Another way of measuring the rate is to analyze the change in soak water brix. The inventors have found that the cracking is minimized when the change in soak water brix is less than about −2.0 and more preferably less than about −1.0 per hour. When the rate of bleed-in of the new soak water is within the ranges described hereinabove, the present inventors have noted that the legumes obtained do not have an excessive amount of cracking.

As indicated hereinabove, the operations of steps 1–4 may be conducted in a soak tank conventionally used in the art. The soak tank may have a water inlet and drain. In addition, the soak tank may be stirred by conventional means or the water may be circulating. The soak tank may be a vertical soak tank typically used in the art.

In an even more preferred embodiment the operations in steps 1–4 are conducted in a horizontal flow soak tank apparatus, as described in copending application Ser. No. 09/489,748, the contents of which are incorporated by reference.

The horizontal soak tank apparatus is described therein. It comprises a series of screens which provide a substantially uniform flow of water through the horizontal soak tank. Moreover, the horizontal tank is connected to a balance tank containing soak water to which temperature controls are imparted, in correlation with desired processing requirements. A suitable pumping arrangement facilitates temperature-regulated water to be pumped in laminar flow through the charge of legumes in the soak tank, and in continuous flow returned through a pumping system to the balance tank over a specified time period. This soak cycle is repeated under varied conditions, both as to temperature and time in circulating the flow through the soak tank, until the intended amounts of solubles have been extracted from the beans, rendering the latter potentially more digestible to a consumer, while retaining the desired texture and taste of the beans.

Figure 2:
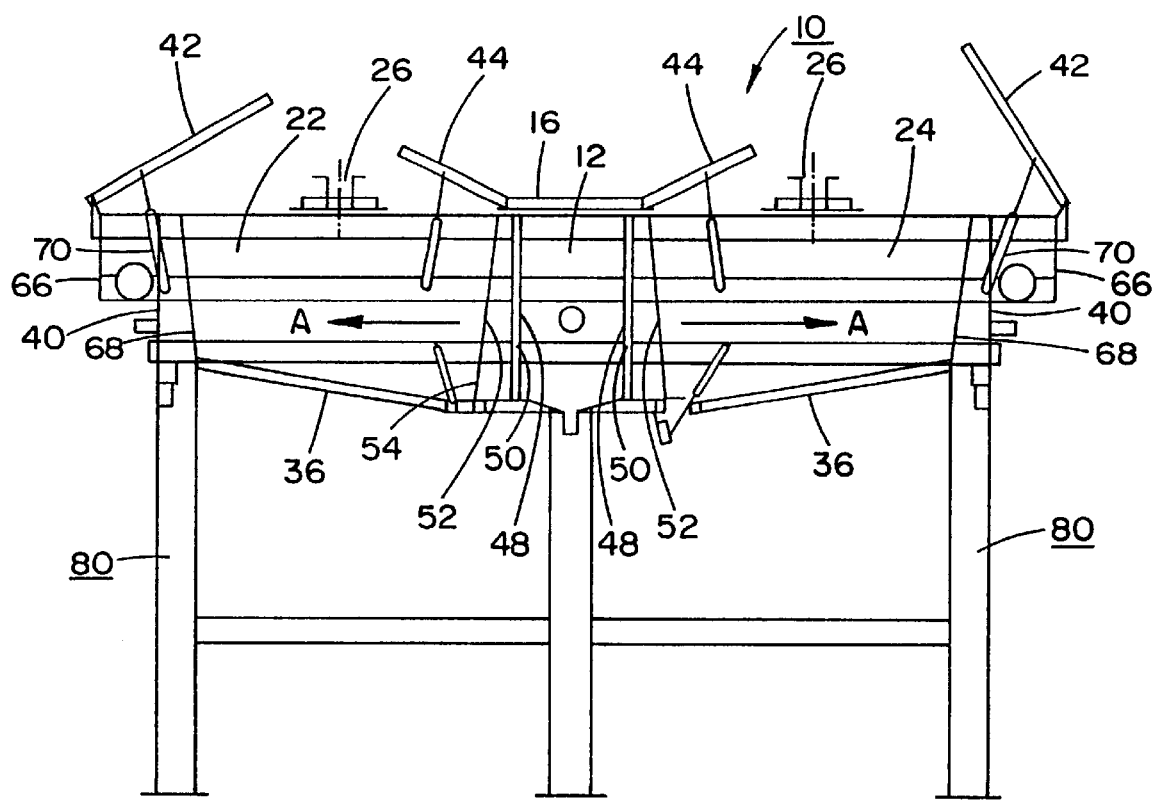
FIG. 2 illustrates a partially sectional front view of the soak tank of FIG. 1.

The apparatus is depicted schematically in FIGS. 1 and 2 and is described in more detail in the copending application referred to hereinabove. As illustrated therein, the apparatus contains a horizontal flow soak tank 10 which includes a header 12 which possesses an inlet 14 for the temperature-controlled water, and has a closable cover 16 for maintaining a superatmospheric pressure in the header. Communicating with the opposite sides 18 and 20 of the header 12 and extending horizontally therefrom in mirror-image arrangement are a pair of hoppers 22, 24, each adapted to receive through inlets 26, a charge of legumes which are to be soaked in a continuous water flow and heated. The header 12 and hoppers 22, 24 communicate by means of a system of screens, wherein the soak tank 10 is in a continuous recirculating water flow connection with a balance tank 28 which provides a continuous flow of processing water under predetermined temperature and timing cycle conditions for effecting the treatment of the beans.

Each hopper 22, 24 has vertically extending sidewalls 32, 34, and a bottom wall 36 which slopes at an upward incline away from the juncture thereof with the lower end of the header 12. Extending along the bottom wall 36 of each hopper proximate the header lower end is a closeable outlet gate 38 for discharge of processed legumes at the termination of the soak cycle. The transverse end of each hopper distant from the header 12 communicates with an overflow through 40 for reconveying the flow of water from the hoppers to the balance tank 28. The hoppers 22, 24 are each adapted to be sealingly closed by covers 42 and 44.

Water is continuously introduced from the balance tank 28 into the header 12 under a superatmospheric pressure and a controlled temperature, and then passed through a system of screens communicating the header 12 with the hoppers 22, 24 so as to flow through the pile of legumes contained in each of the hoppers of the horizontal flow soak tank. The water, after passing through the piles of legume in a generally horizontal laminar flow path is passed through a further screen into an overflow trough and then recirculated into to the balance tank 28 by means of a pumping circuit, temperature-regulated in the balance tank and again returned to the header for recirculation through the hoppers, thereby providing a continuous flow circuit.

The system of screens employed in the horizontal flow soak tank 10 provides a first set of screens between the header 12 and each respective hopper 22 and 24. The screen 48, together with a further closely spaced parallel screen 50, each possessing a small mesh, will convert turbulent flow of the water within the header 12 into a non-laminar but not quite turbulent flow. The flow passing through parallel screens 48, 50 create a plug-type water flow extending horizontally across the width of the tank containing the pile of legumes towards the overflow trough.

The screen 52, which functions as an endwall for each respective hopper 22 and 24, is inclined relative to the vertical, so that the bottom end 54 thereof is extended forwardly to be closely adjacent to the edge of the respective elongate gate 38 for discharging processed legumes at the termination of the extraction of solubles. This inclined orientation of the screen 52, in conjunction with the upwardly sloping bottom wall 36 of each hopper will impart a slight upward circulation to the pile of legumes and provide a relief angle for product expansion during rehydration, ensuring a uniform treatment thereof. In addition, the use and location of screen 52 separates the pile of legumes from the negative impact of direct impingement of the soak water media exiting mesh screen 48, 50.

At the discharge end 66 of each hopper 22 or 24 there is located a screen 68 which is similar to screen 52, but which is inclined at a reverse angle relative thereto. A solid baffle 70 arranged exteriorly of screen 68 imparts an under-overflow to the water exiting from the soak tank as it is recirculated to the balance tank 28. The screen 68 acts as an inclined plane to provide a relief angle for the bean pile as swelling takes place.

In essence, the entire horizontal flow soak tank 10 may be supported on suitable support structure 80.

Located at regions within the hoppers 22, 24 containing the beans which are to be processed are a plurality of temperature sensors 84 which will constantly monitor the temperature of the process water.

The operation of the soak tank system is essentially as follows:

The empty clean hoppers 22, 24 are initially filled with water at ambient temperature.

The legumes are then added to the tank, wherein the amount of legumes added will vary, based on the swelling characteristics of a particular genus.

In the balance tank 28, the water is heated to the first temperature and recirculated through the legume pile in horizontal plug flow in the first step of the process to permit rehydration of the legume.

Thereafter, the water is heated to a second temperature and recirculated through the system in horizontal plug flow to permit diffusion of the sugar and other solubles from the legumes into the soak water and to permit the natural oligosaccharide reducing enzyme to hydrolyze the flatulence-causing sugars.

The water is then heated slowly to a third temperature as described hereinabove. If blanching occurs, the water is then heated to blanching temperatures.

As described hereinabove, when the brix of old soak water is high, to ameliorate the foregoing, fresh soft water is bled into the recirculating water. A different number of bleed-in levels would be acceptable, wherein a preferred rate of bleed-in of fresh water is about 1% to about 4%; in essence, fresh water is added at a volume of about 2.6% of the recirculating flow rate and old water is removed at about the same rate to maintain a constant water level. In a preferred embodiment, when water is circulated at 300 gallons per minute, 10 gallons per minute of old waters is drained off, upon which there is automatically added 28 gallons per minute of fresh, soft water in order to maintain the water level.

In a further preferred embodiment, there is provided an additional relatively large-apertured screen upstream of the small-hole screens or perforated plates. This upstream screen merely removes large particles, such as debris, twigs, legume skin, and the like which can enter the recirculating system.

The water flow through the final slotted or ribbed wire screen 52 is substantially equal in its distribution and very slow across the entire screen surface, preferably about 1 cm per second.

The balance tank 28 is level-controlled, using well known control technology and discharges into a recirculating pump wherein a series a valves permit bleed-out of old water, while a level controller bleeds in fresh water. A second valve permits old waters to be discharged while the level controller concurrently adds fresh water.

Unless indicated to the contrary, the percentages used herein are by weight.

Unless indicated to the contrary, when referring to temperatures in the process, it is understood that reference is made to the temperature in Fahrenheit of the soak water in which the legumes are immersed.

The following examples further illustrate, but do not limit, the present invention.

Furthermore, in reviewing the following examples, it is to be understood that the free moisture of the soak tank plus balance tank is defined as the total water in the balance tank and associated communication means and the volume in the soak tank less the volume of the legumes in the soak tank. The volume of legumes are measured experimentally.

For example, with navy beans, a small container is filled with soaked beans and weighed. The container is then filled to the brim with water and weighed a second time. The container is emptied and filled with water and weighed, for example, a 16 oz can for navy beans hold 448 ml of water. A can of navy beans typically weighs 298 g. The volume of bean and water used therefore weighs 482 g. The free water in the can is 482–298 is 184 g. The free water percent in the can is (184×100)/448=41%.

The free water in the apparatus used in some of the examples described hereinbelow is calculated the same way. For example, the balance tank volume is 149 gallons. The soak tank volume is 206 gallons. Together the volume is 355 gallons. A typical free moisture is therefore 0.41 (206+149)= 233 gallons.

Variation in bean swelling caused variations in the free moisture calculation.

In the following examples, % oligosaccharide in the legume and % starch gelation were determined using the following techniques.

(a) % Oligosaccharides

This was determined in accordance with Procedure AOAC 977.20, incorporated herein by reference, utilizing a standard liquid chromatograph having a column 300×4 (id) mm $\mu$ Bondapak/Carbohydrate. The flow rate was 1.0 ml/min and the temperature setting is at ambient temperature.

The reagents used for the mobile phase is acetonitrile diluted with water ranging from 60 parts acetonitrile/40 parts water (v/v) to 90 parts acetonitrile/10 parts water (v/v), with 70:30 acetonitrile/water being the optimum (v/v).

The standards used were fructose, glucose, raffinose, stachyose, and verbascose. One gram of each of the sugars was dissolved separately in 100 mL of water, then 4 parts of the aqueous solution was diluted with 6 parts (v/v) of acetonitrile. 20 $\mu$L of each of these solutions were injected into the liquid chromatograph to obtain the retention times.

In preparing the bean sample if it were a paste, about 15 g is weighed into shaker cup, 100 mL of water were added thereto, and sample was shaken for at least 30 minutes to assure dissolution of sugar. Liquid samples from the beans were used as is, 4 parts of aqueous solution was diluted with 6 parts (v/v) of acetonitrile, allowed to sit for at least two minutes to assure precipitation of insolubles, then filtered and injected into the liquid chromatograph.

20 $\mu$L of sample is injected and the % of oligosaccharide present is determined by integrator values or from peak heights as follows:

weight % sugar=$100 \times PH/PH^1 \times (V/V^1) \times (W^1/W)$ where PH and $PH^1$=peak heights (or integrator values) of sample and standard, respectively; V and $V^1$=mL sample and standard solutions; and W and $W^1$=g sample of standard, respectively.

(b) Gelation

Gelatinization is reported as the percent of total starch that is enzymatically available due to heat, mechanical or chemical damage of the starch granule under conditions of the test.

Total starch is determined by AACC method 76–11, AOAC method 979.10 and AOAC method 999.16, the contents of all of which are incorporated by reference.

The reagents used in the test are:

1. 80% ethanol. Add 800 mL ethanol to a 1 liter flask, add 200 mL DI water, and mix well.
2. Phosphate buffer pH 6.0.

Add 7.7 grams sodium phosphate dibasic and 35.0 grams sodium phosphate monobasic to 2 liters of distilled water. Mix to dissolve and dilute to 4 liters. Adjust pH to 6.0 with concentrated phosphoric acid.

3. Phosphate buffer 4.3 pH. Add 43 grams sodium phosphate monobasic to 4 liters of distilled water—mix to dissolved and adjust to pH 4.3 with acid.
4. GOP—Glucose oxidase-peroxidase.

Mix together portions of the following solutions separately.

a. Solution A 1. sodium phosphate dibasic anhydrous—4.601 grams
2. sodium phosphate monobasic monohydrate—1.056 grams
3. Benzoic acid ($C_7H_6O_2$)—4.000 grams
4. 4-Hydroxybenzoic acid ($C_7H_6O_3$)—3.000 grams Dissolve these chemicals in 1800 mL water in a 2 liter volumetric flask by stirring several hours at room temperature. Dilute to mark and mix well. Adjust pH to 7.4 with 6 M NaOH. Solution is stored at 4° C., and is stable for at least 12 months.

b. Solution B

In a screw-cap test tube, weigh enough glucose oxidase so that 25,000 units are obtained. Tare the test and weigh in 2.0 grams of finely ground ammonium sulfate to stabilize the enzyme. Mix the enzyme and ammonium sulfate thoroughly before the addition of water. Pipet 2 mL water and mix into a thick slurry. Pipet 2 more mL of water and mix again. Store at 4° C.

c. Solution C

Weigh exactly 10,000 Units Sigma P-8250 peroxidase into a paper cup or beaker. (Approximately 0.6 grams)

d. Solution D

Add 15 mL water to 0.3 grams of 4-aminophenazone (i.e., 4-aminoantipyrine). This solution must be made fresh just before preparation of the working solution and any extra is discarded after use.

e. Working Solution

To a liter amber volumetric flask, add the following:

1. Solution A, 500 mL
2. Solution B, 1.0 mL—(Glucose oxidase)
3. Solution C, 1.0 mL—(Peroxidase 10,000 units)
4. Solution D, 5.0 mL (4-AAP)
5. Solution A, 500 mL This GOP is stable for three months when stored in the dark at 4° C.

The % of gelatinization in the legumes is tested on the final bean product after retorting in which the vehicle has been added to the legume. Prior to measuring the % gelation, the legume is separated from the sauce by filtering (straining into a strainer) and washing the collected legumes.

If sugars have been added to the legumes during the processing, then the sample is desugared by grinding a weighed (if Bean wet, the amount is 1.5 g, if Bean in sauce the amount is 5.0 g) sample, and mixing with boiling water (7 ml if wet Bean, 4 ml if Bean in sauce), removing precipitate, and extracting the sugars with denaturing ethyl alcohol (35 mL) and centrifuging the samples at ¾ speed in 1 EC HN SII for 5 min., decanting off and discarding the alcohol, adding the appropriate buffer thereto (4.3 pH buffer, if the sample used is to determine gelatinized starch in the legume, and pH 6.0 buffer if sample is used to determine total starch in sample) mixing.

| PROCEDURE FOR TOTAL AND GELATINIZABLE STARCH Weight Table | |
|---|---|
| Bean, wet (no syrup) | 1.5 g |
| Bean, dry | 1.0 g |
| Flour, wheat | 0.5 g |
| Glucose (standard) | 0, 0.1, 0.2, 0.3, 0.4, 0.5 grams |
| Wheat starch (standard) | 0, 0.1, 0.2, 0.3, 0.4, 0.5 grams |

Procedure:

1. The appropriate amount of ground sample is weighed into a flask. 5 standards are used using wheat starch for total starch, and glucose for gelatinizable starch.

2. 50 mL of the appropriate buffer, are added thereto, (pH 4.3 for determining gelatinizable starch and pH 6.0 for total starch.)

3. TOTAL STARCH—AUTOCLAVE (Skip the next step for determining gelatinizable starch)

4. 0.2 mL of heat stable amylase is added to the ground sample and mixed, and autoclaved, for 60 minutes at 121 psi. Cool to touch, add a magnetic stir bar, and adjust pH to 4.5±0.2 with 1N HCl.

5. 0.2 mL amyloglucosidase is added to the flask.

6. The samples are incubated with stirring for 120 minutes. Cool overnight.

7. The contents are transferred to a labeled 500 mL volumetric flask. Dilute to volume and invert 10 times.

8. A portion of the liquid is removed and place in a 1.5 mL labeled mini centrifuge tube. Centrifuge for 5 minutes.

9. A 100 µL portion is pipeted into each of two 13×100 mm tubes. Add 3.0 mL glucose oxidase/peroxidase reagent to each tube. Incubate for 30 minutes at 50° C. Remove and cool for at least 30 minutes. The absorbance is measured at 510 nm.

Establish a starch curve by plotting the absorbance at 510 nm versus weight of standard.

$$\text{Total starch} = \frac{\text{(Starch from curve)}}{\text{Sample weight}} \times 100$$

$$\text{Gelatinizable starch} = \frac{\text{(Glucose from Curve)}}{\text{Sample weight}} \times .9 \times 100$$

EXAMPLE 1

371 g of pinto beans were soaked in 1600 mL of soft water at 143° F. for 123 minutes. Then, the soak water was changed with 1150 mL fresh water. The beans were soaked an additional two hours. The soak water was changed a second time with 985 mL of fresh soft water. The beans were soaked an additional two hours. The water was changed a third time. The beans were washed an additional thirty minutes at 144° F.

The temperature was raised sequentially as follows:

| Time (Minute) | Temp. (° F.) |
|---|---|
| 4 | 152 |
| 4 | 155 |

The beans were canned, brine added thereto and retorted.

The oligosaccharide level was 0.02%, starch gelation was 85%. Trained tasters described the product as having a smooth skin and being firm.

COMPARATIVE EXAMPLE 1

Leading brands of commercial navy Baked Beans were fed to a panel of adult men and woman. The panelists who have fasted from 11:00 pm the previous night, ate the beans at 8:30 am, and ate no other solid food, and took no liquid beverage except coffee, water, or tea until 4:30 pm. The panelists recorded all incidences of flatulence during the 8 hour evaluation period.

| Product | Number of Panelists | Average Number of Flatus incidences over 8 hour evaluation period |
|---|---|---|
| Brand 1 | 57 | 13.0 |
| Brand 1 (repeated) | 53 | 13.0 |
| Brand 2 | 51 | 13.0 |
| Brand 1 with commercial Alpha-galactoses Food Enzyme added | 41 | 12.0 |

EXAMPLE 2

700 pounds of dry navy beans were placed into a horizontal soak tank described hereinabove containing 355 gallons of 34.2 ppm calcium carbonate for 6 minutes. The water was recirculated at 90 gallons per minute. The temperature was raised to 119° F. for a total elapsed time of 39 minutes (from dry bean addition to end of step 1).

The temperature was raised to 135° F. for an additional 94 minutes; fresh soft water was then bled to the system at 2.8 gallons per minute for 52 minutes and the added water heated to 135° F. Then, bleed-in of water was terminated, but the 90 gallons per minute recirculation was retained for an additional 84 minutes. The soak water brix was 2.0.

The soak water was changed with fresh soft water, which was heated to 135° F. then recirculated for an additional 90 minutes (at 135° F.). The final brix was 0.5.

The soak water was changed a second time, and heated to 135° F. then recirculated for an additional 51 minutes. The final brix was 0.0.

The soak water was changed a third time and the temperature heated to 146° F. for 7 minutes (time at 146° F). The temperature was raised to 149° F. for 7 minutes (time at 149° F.). The temperature was raised to 152° F. for 7 minutes.

The temperature was raised to 162° F. for 7 minutes. The total elapsed time was 473 minutes. Beans were canned in baked bean sauce, and retorted normally.

There were no oligosaccharides; starch gelation averaged 68.5%. There were about 16% cracked beans. In a 50 person feeding study, panelists averaged 7.1 releases of flatus in an 8 hour study period.

EXAMPLE 3

700 pounds of navy beans were added to 355 gallons of soft 101° F. water in a horizontal soak water tank described hereinabove. The beans were initially soaked at 101° F. for 41 minutes.

The temperature was increased to 146° F. for 147 minutes (17 minutes heat up plus 130 minutes at 146° F.). The soak water was changed with fresh, soft water. Soaking continued for an additional 110 minutes.

The soak water was changed a second time with fresh, soft water and soaked for an additional 100 minutes.

The soak water was changed a third time and soaked an additional 45 minutes at 146° F.

Then the temperature was increased to 149° F. for 8 minutes, then increased to 151° F. for 24 minutes (time after achieving 151° F.), then increased to 154° F. for 24 minutes. Finally the temperature was increased to 182° for 8 minutes. The tank was drained and the beans were canned with Baked Bean Sauce and retorted.

The total elapsed time in the soak tank was 544 minutes.

The percent cracked beans was 50%. There were no oligosaccharides. Starch gelation was 86%.

EXAMPLE 4

700 pounds of dry navy beans were added to 355 gallons of soft water at 101° F. for 30 minutes. The water temperature was increased to 135° F. for 130 minutes, then the soak water was drained and replaced with fresh soft 135° F. water. The beans were soaked an additional 30 minutes at 135° F., then the water temperature was increased to 141° F. for 60 minutes. The soak water was drained and replaced a second time. The beans were soaked for 90 minutes at 141° F. The water was drained a third time and then the beans were soaked 30 minutes at 141° F. The temperature was raised to 149° F. for 6 minutes, then 154° F. for 6 minutes, then 160° F. for 6 minutes, then blanched at 182° F. for 6 minutes. The beans were drained and canned with baked bean sauce at 110° F. Cracks were 42%.

EXAMPLES 5–8

A series of experiments were then conducted where the only variable changed was the way the fresh, soft water was bled into the horizontal soak tank described hereinabove. That is, instead of periodically changing all the soak water at once, various bleed-in rates of fresh soft water were tested.

700 pounds of dry navy beans were added to 355 gallons of water (34.2 ppm calcium carbonate) at 80° F. for 6 minutes. The temperature was raised to 120° F. for 20 minutes. Then the beans were soaked for 146 minutes at 135° F. Fresh, soft water was bled into the soak tank at different rates and different times, as per table. The bleed-in was terminated at the end of said 146 minutes. After the bleed-in, the beans were soaked an additional 24 minutes at 135° F. The temperature was raised to 141° F. for 60 minutes, then the water was drained and replaced with fresh, soft water. The beans were soaked for 90 minutes at 141° F., then the water was drained and replaced a second time. The beans were soaked an additional 45 minutes at 141° F. The water was drained a third time and the temperature raised to 148° F. for 2 minutes, then 152° F. for two minutes, then 157° F. for 2 minutes, then 160° F. for 2 minutes, then blanched at 181° F. for 8 minutes. The beans were drained, canned with baked bean sauce and cooked. There were no oligosaccharide in the beans. Starch gelation was 84%.

The results are shown in the table.

| Example Number | Soak Water Brix (at initiation/ termination of bleed-in) | Bleed-in time (minutes) | Bleed-in rate (gallons per minute) | % Cracking |
|---|---|---|---|---|
| 5 | 1.9/1.5 | 28 | 7.7 | 50 |
| 6 | 2.1/1.1 | 38 | 4.8 | 66 |
| 7 | 1.8/1.5 | 44 | 3.6 | 58 |
| 8 | 1.1/1.2 | 52 | 2.8 | 18 |

EXAMPLE 9

700 pounds of dry navy beans were treated as described in Example 2 except the bleed-in times were varied. The free water volume (total-bean volume) was 268 gallons. The % cracked beans is tabulated below.

| | % Cracked | Bleed-in Time (min) | Bleed-in Rate (145 gal)/bleed-in time – (gal/min) |
|---|---|---|---|
| Δbrix/8 minutes ≧–.2 | 42 | 6 | 24.2 |
| | 66 | 38 | 3.8 |
| | 58 | 44 | 3.3 |
| Δbrix/8 minutes <–.2 | 15 | 52 | 2.8 |
| | 14 | 67 | 2.2 |
| | 20 | 84 | 1.7 |

Brix was analyzed every 8 minutes. When the change in brix (final-initial) in any 8 minute measuring period was ≧–0.2, significant cracking was observed. When the change in brix was <–0.2, cracking was minor.

EXAMPLE 10

400 grams of dry navy beans were added to 1600 ml of soft water at 110° F. and soaked for 90 minutes in a 91.5° F. constant temperature bath. The soak water was drained (1150 ml), replaced with an equal volume of 135° F. soft water and soaked for 180 additional minutes in a constant temperature bath set at 139° F. The soak water was similarly replaced a second time with 1075 ml of 135° F. soft water and soaked for an additional 30 minutes in a constant temperature bath set at 139° F. The covered beaker was transferred to a constant temperature bath set at 156° F. The beans, as transferred, were 135° F. The bean temperature varied while sitting in the 156° F. bath as follows:

| Elapsed time (min) | Measured Temperature (° F.) |
|---|---|
| 305 | 144 |
| 310 | 148 |
| 315 | 150 |
| 320 | 152 |
| 325 | 153 |
| 330 | 152 |
| 325 | 150 |
| 340 | 150 |

The beans were transferred to another bath set at 201.5° F. for 15 minutes. Bean temperature was 167° F. The beans were canned in baked bean sauce and retorted. Oligosaccharides were 0.020%. Starch gelation was 91%.

EXAMPLE 11

650 pounds of dry pinto beans were added to 355 gallons of a mixture of ⅔ soft water and ⅓ natural hard water at 80° F. water in a horizontal soak tank, as described hereinabove and permitted to soak at 80° F. for 6 minutes. Moisture was 21.8%. The water was recirculated at 90 gallons per minute. The temperature was increased to 128° F. for 30 minutes. Moisture was 38.3%. Then the temperature was increased to 147° F. for 2 hours. Moisture was 59.9%. The brix was 2.0. Fresh soft water was bled-in at 2.8 gallons per minute for an additional 5 hours. The brix first rose to 1.7, then declined to 0.3 as the sugars were removed.

After a total elapsed time of 482 minutes, the soak water was replaced with fresh soft water at 145° F. The pinto beans were soaked an additional hour at 147° F.

Then the beans were heated to 150° F. for 8 minutes, then 155° F. for 8 minutes and finally 160° F. for 8 minutes. Total elapsed time in the soak tank was 581 minutes. The beans were canned in brine and retorted. Cracks were 7.3%, oligosaccharides were zero and starch gelation was 86.6%.

EXAMPLE 12

A process similar to the process of Example 11 was conducted on kidney beans. Total elapsed time in the soak tank was 568 minutes. There were 3.8% cracked beans. Oligosaccharides present in the beans were 0.000%. Starch gelation was 77.1%.

EXAMPLE 13

650 pounds of dry kidney beans were soaked in 355 gallons of 140° F. soft water for 127 minutes in a horizontal soak tank as described hereinabove. Then the soaked water was replaced with fresh soft water. The beans were soaked 2 more hours at 140° F. and the wash water was replaced a second time. The beans were soaked an additional two hours (at 140° F.) then the soak water was changed with fresh, 100 ppm calcium water. The elapsed time was 379 minutes.

The beans were sequentially heated as per the after the third water change.

| Elapsed Time (min) | Temperature (° F.) |
|---|---|
| 425 | 141 |
| 436 | 148 |
| 445 | 154 |
| 453 | 158 |
| 464 | 165 |
| 473 | 169 |
| 483 | 176 |

The oligosaccharide remaining were 0.030%

The starch gelation was 84% after canning in brine with calcium added and retorting.

COMPARATIVE EXAMPLE 2

650 pounds of dry kidney beans were added to 355 gallons of soft water at 135° F. After 168 minutes of soaking at 135° F., the water was changed with fresh soft 135° F. of water. After 2 hours of additional soaking, the water was changed a second time. After 2 more hours of soaking at 135°, the water was changed a third time. The beans were soaked 75 more minutes (501 minutes total elapsed time), then canned in brine and retorted. Starch gelation was 74%.

EXAMPLES 14–18

A series of experiment were conducted on a variety of bean types using the protocol described herein. In each experiment the soak water was changed 3 times. However, as bleed-in of fresh water did not occur, the texture and cracking are non-ideal Experimental conditions were comparable except as noted.

|  | Step I | | Step II | | Step III | | Step IV | | | Starch |
|---|---|---|---|---|---|---|---|---|---|---|
|  | Time | Temp | Time | Temp | Time | Temp | Time | Temp | Olig. | gelation |
| Garbanzo | 36 | 102 | 761 | 141 | 8 | 150 | 8 | 182 | zero | 83% |
|  |  |  |  |  | 24 | 152 |  |  |  |  |
|  |  |  |  |  | 24 | 155 |  |  |  |  |
| Pinto | 45 | 101 | 635 | 146 | 8 | 149 | 8 | 182 | zero | 88% |
|  |  |  |  |  | 24 | 151 |  |  |  |  |
|  |  |  |  |  | 24 | 154 |  |  |  |  |
| Black eye (Purple Hull) | 45 | 101 | 633 | 146 | 8 | 149 | 8 | 182 | zero | 90% |
|  |  |  |  |  | 24 | 151 |  |  |  |  |
|  |  |  |  |  | 24 | 154 |  |  |  |  |
| Kidney | 45 | 101 | 631 | 136 | 8 | 149 | 8 | 183 | zero | 88% |
|  |  |  |  |  | 24 | 151 |  |  |  |  |
|  |  |  |  |  | 24 | 154 |  |  |  |  |

-continued

|  | Step I | | Step II | | Step III | | Step IV | | | Starch |
|---|---|---|---|---|---|---|---|---|---|---|
|  | Time | Temp | Time | Temp | Time | Temp | Time | Temp | Olig. | gelation |
| Black | 35 | 101 | 416 | 136 | 8 | 149 | 8 | 182 | zero | 92% |
|  |  |  |  |  | 24 | 151 |  |  |  |  |
|  |  |  |  |  | 24 | 182 |  |  |  |  |

EXAMPLE 19

650 pounds of black eyed peas (California) were added to 355 gallons of soft water at 101° F. for 51 minutes. The temperature was raised to 1460 for 225 minutes. The water was drained and replaced with fresh soft water and soaked for an additional 180 minutes at 146° F. The water was changed a second time and soaked for 150 minutes at 146° F. The water was changed a 3rd time and soaked for an additional 60 minutes at 148° F. The temperature was raised to 149° F. for 8 minutes, 151° F. for 24 minutes, 154° F. for 24 minutes, then blanched at 182° for 8 minutes. The total elapsed time was 765 minutes, starch gelation was 90%.

COMPARATIVE EXAMPLE 3

400 g black eyes were soaked in 1500 ml of soft water at 103° for 45 minutes. The temperature was raised to 140° F. for 205 minutes. The water was changed and soaked for 110 minutes at 137° F. The water was changed and soaked for 100 minutes at 139° F. The water was changed a 3rd time and soaked 45 minutes at 137° F. The temperature was raised to 149° F. for 45 minutes. The beans were not blanched. Starch gelation was 76%.

COMPARATIVE EXAMPLE 4

The process as in Comparative Example 3 was 3 followed except the product was blanched at 160° F. Starch gelation was 76%.

EXAMPLE 20

700 pounds of dry navy beans were added to 355 gallons of soft water at 101° F. or 30 minutes. The water temperature was increased to 135° F. for 130 minutes, then the soak water was drained and replaced with fresh soft 135° F. water. The beans were soaked an additional 30 minutes at 135° F., then the water temperature was increased to 141° F. for 60 minutes. The soak water was drained and replaced a second time. The beans were soaked for 90 minutes at 141° F. The water was drained a third time and then the beans were soaked for 30 minutes at 141° F. The temperature was raised to 149° F. for 6 minutes, then 154° F. for 6 minutes, then 160° F. for 6 minutes, then blanched at 182° F. for 6 minutes. The beans were drained and canned with baked bean sauce at 110° F. Cracks were 42%.

EXAMPLES 21–24

A series of experiments were then conducted using the horizontal soak tank described herein where the only variable changed was the way the fresh, soft water was bled into the soak tank. That is, instead of periodically changing all the soak water at once, various bleed-in rates of fresh soft water were tested.

700 pounds of dry navy beans were added to 355 gallons of water (34.2 ppm calcium carbonate) at 80° F. for 6 minutes. The temperature was raised to 120° F. for 20 minutes. Then the beans were soaked for 146 minutes at 135° F. Fresh, soft water was bled into the soak tank at different rates and different times, as per the following table. The bleed-in was terminated at the end of said 146 minutes. After the bleed-in, the beans were soaked an additional 24 minutes at 135° F. The temperature was raised to 141° F. for 60 minutes, then the water was drained and replaced with fresh, soft water. The beans were soaked for 90 minutes at 141° F., then the water was drained and replaced a second time. The beans were soaked an additional 45 minutes at 141° F. The water was drained a third time and temperature and the temperature raised to 148° F. for 2 minutes, then 152° F. for two minutes, then 157° F. for 2 minutes, then 160° F. for 2 minutes, then blanched at 181° F. for 8 minutes. The beans were drained, canned with baked bean sauce and cooled. There were no oligosaccharides in the beans. Starch gelation was 84%.

The results are shown in the table. The free moisture in the system was 268 gallons.

| Experiment # | Soak Water Brix (at initiation/ termination of bleed-in) | Bleed-in time (minutes) | Bleed-in rate (gallons per minute) | % Cracking |
|---|---|---|---|---|
| 21 | 1.9/1.5 | 28 | 7.7 | 50 |
| 22 | 2.1/1.1 | 38 | 4.8 | 66 |
| 23 | 1.8/1.5 | 44 | 3.6 | 58 |
| 24 | 1.1/1.2 | 52 | 2.8 | 18 |

EXAMPLE 25

400 g of dry navy beans were soaked in 1500 ml of soft water for 90 minutes at 90° F. The water was changed and the beans were soaked 180 minutes at 134° F., one-third of the water was changed and soaked an additional hour at 134° F. Another one-third of the water was changed and the beans were soaked one more hour. The temperature was raised to 148° F. for 30 minutes, then blanched 20 minutes at 184° F. Starch gelation was as per table. Starch gelation was 76%.

| Time (min) | Temperature | % Starch Gelation |
|---|---|---|
| 0 | 91° F. | 9 |
| 300 | 134° F. | 7 |
| 345 | 149° F. | 15 |
| 365 | 184° F. | 48 |

At 149° F. starch gelation was initiated.

The above preferred embodiments and examples are given to illustrate the scope and spirit of the present invention. These embodiments and examples will make apparent to those skilled in the art other embodiments and examples. These other embodiments and examples are within the contemplation of the present invention.

Therefore, the present invention should be limited only by the appended claims.

What is claimed is:

1. A process for reducing flatulence caused by ingestion of a legume comprising:
   (a) soaking a cleaned legume in a water bath having stagnant, sprayed or flowing water at a first temperature which is above ambient temperature but less than the critical rehydration temperature of the legume and under conditions effective to rehydrate the legume to at least 50% by weight of that of a fully hydrated legume;
   (b) soaking and heating the rehydrated legume of step (a) at a second temperature and at a pH ranging from about 5.5 to about 9.0 under conditions effective to diffuse flatulence-causing oligosaccharides from the legume to the soak water and to permit the naturally occurring oligosaccharide reducing enzyme present in the legume to digest any remaining flatulence-causing oligosaccharides present therein to produce a legume that has substantially all of the flatulence-causing oligosaccharides removed therefrom, said second temperature being greater than said critical rehydration temperature and said first temperature, but less than the inactivation temperature of said enzyme; and
   (c) soaking the legume product obtained from step (b) in a water bath at a third temperature, under conditions effective and for a time sufficient to initiate starch gelation, said third temperature being greater than the first and second temperatures and the inactivation temperature of the oligosaccharide reducing enzyme and below the temperature at which blanching of the legume product would occur; and
   (d) optionally blanching the legume product of step (c).

2. The process according to claim 1 wherein the legume is a navy bean, pinto bean, kidney bean, great northern bean, white bean, black bean, red bean, cranberry bean, lima bean, purple hull bean, garbanzo bean, chick pea, pink bean, calico bean, black eye pea, field pea, lentil, soybean or combination thereof.

3. The process according to claim 1 wherein the water utilized is tap water, deionized water, soft water, distilled water or combination thereof.

4. The process according to claim 1 wherein the initial soak water utilized in step (a) has a calcium concentration of 0 to about 120 ppm.

5. The process according to claim 1 wherein step (a) is conducted at temperature ranging from about 90° F. to about 130° F.

6. The process according to claim 1 wherein the temperature of step (b) ranges from about 125° F. to about 150° F.

7. The process according to claim 1 wherein the temperature for step (c) ranges from about 150° F. to about 165° F.

8. The process according to claim 1 which additionally comprises pre-conditioning the legume product.

9. The process according to claim 1 wherein step (b) further comprises changing the water in the water bath.

10. The process according to claim 9 wherein changing the water in the water bath comprises adding fresh water having a calcium concentration ranging from 0 ppm to 90 ppm and removing water that was present in the water bath prior to the addition of fresh water.

11. The process according to claim 10 wherein addition of fresh water and the removal of water present in the water bath prior to the addition of fresh water occurs at a rate sufficient to maintain a positive oligosaccharide-concentration reduction driving force.

12. The process according to claim 1 wherein step (b) further comprises:
   (1) adding fresh water and removing water which was present in the water bath prior to the addition of fresh water thereto at a rate sufficient to maintain a positive oligosaccharide concentration reduction driving force and to minimize rupture or cracking of the legume skin;
   (2) continuing to soak the legume at said second temperature until substantially all of the flatulence-causing oligosaccharides are removed from the legume or until there is no longer a positive oligosaccharide concentration reduction driving force, whichever comes first; and
   (3) repeating steps (1) and (2) until substantially all of the flatulence-causing oligosaccharides are removed from the legume.

13. A process for preparing a legume product which comprises:
   (a) soaking a legume in a water bath having stagnant, sprayed or flowing water at a first temperature which is above ambient temperature but less than the critical rehydration temperature of the legume and under conditions effective to rehydrate the legume to at least about 50% by weight of that of a fully hydrated legume;
   (b) soaking and heating the rehydrated legume of step (a) at a second temperature and at a pH ranging from about 5.5 to about 9.0 under conditions effective to diffuse flatulence-causing oligosaccharides from the legume to the soak water and to permit the naturally occurring oligosaccharide reducing enzyme present in the legume to digest any remaining flatulence-causing oligosaccharides present therein to produce a legume that has substantially all of the flatulence-causing oligosaccharides removed therefrom, said second temperature being greater than said critical rehydration temperature and said first temperature, but less than the inactivation temperature of said enzyme;
   (c) soaking the legume product obtained from step (b) in a water bath at a third temperature, under conditions effective and for a time sufficient to initiate starch gelation, said third temperature being greater than the first and second temperatures and the inactivation temperature of the oligosaccharide reducing enzyme and below the temperature at which blanching of the legume product would occur;
   (d) optionally blanching the product of step (c);
   (e) adding a food acceptable vehicle to the legume so produced to form a legume containing mixture comprising from about 5% to about 75% by weight of legumes and the remainder being said vehicle; and
   (f) preserving the product of step (e).

14. The process according to claim 13 wherein the legume is a navy bean, pinto bean, kidney bean, white bean, black bean, red bean, lima bean, pink bean, cranberry bean, calico bean, great northern bean, purple hull bean, chick pea, black-eye pea, field pea, cowpea, garbanzo bean, lentil, soybean or combination thereof.

* * * * *